United States Patent
Kim et al.

(10) Patent No.: US 11,758,081 B2
(45) Date of Patent: *Sep. 12, 2023

(54) SERVER AND METHOD FOR DISPLAYING 3D TOUR COMPARISON

(71) Applicant: 3I INC., Daegu (KR)

(72) Inventors: Ken Kim, Seoul (KR); Ji Wuck Jung, Goyang-si (KR)

(73) Assignee: 3i Inc., Daegu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,288

(22) Filed: Aug. 27, 2021

(65) Prior Publication Data
US 2022/0060640 A1    Feb. 24, 2022

Related U.S. Application Data

(63) Continuation of application No. 17/084,305, filed on Oct. 29, 2020, now Pat. No. 11,451,720.

(30) Foreign Application Priority Data

Oct. 29, 2019   (KR) .................. 10-2019-0135428
Oct. 29, 2019   (KR) .................. 10-2019-0135807

(51) Int. Cl.
*H04N 5/262*    (2006.01)
*H04N 7/18*     (2006.01)
*H04N 23/698*   (2023.01)

(52) U.S. Cl.
CPC ........... *H04N 5/2624* (2013.01); *H04N 7/181* (2013.01); *H04N 23/698* (2023.01)

(58) Field of Classification Search
None
See application file for complete search history.

(56) References Cited

U.S. PATENT DOCUMENTS 10,937,247 B1 * 3/2021 Chuah ................. G06T 7/60
2014/0212110 A1 * 7/2014 Lee .................... A61B 8/469
                                                      386/282

FOREIGN PATENT DOCUMENTS

JP    2012-169723 A    9/2012
JP    2018013562       1/2018
(Continued)

OTHER PUBLICATIONS

Office Action dated Aug. 21, 2020 in Korean Application No. 10-2019-0135428.
(Continued)

*Primary Examiner* — Daniel T Tekle
(74) *Attorney, Agent, or Firm* — JCIPRNET

(57) ABSTRACT

The described technology is a technique related to a system and method for displaying 3D tour comparisons. The method for displaying a 3D tour comparison including setting each reference point for first and second tours that are different from each other, and setting coordinate values for a plurality of image photographing points included in the first and second tours, respectively, in the first tour, setting a first point that is one of the plurality of image photographing points included in the first tour, in the second tour, selecting a second point closest to the coordinate value of the first point out of the plurality of image photographing points included in the second tour, and displaying an image related to the first point on a part of a split-screen of a split-screen, and displaying an image related to the second point on at least a part of the rest of the split-screen of the split-screen.

11 Claims, 15 Drawing Sheets

(56) References Cited

FOREIGN PATENT DOCUMENTS

| JP | 2018-041259 A | 3/2018 |
|----|----|----|
| KR | 20140096704 | 8/2014 |
| KR | 10-1782057 B1 | 9/2017 |
| KR | 101952131 | 2/2019 |
| KR | 10-2019-0034130 A | 4/2019 |
| KR | 20190066892 | 6/2019 |
| WO | WO 2017/125296 A1 | 7/2017 |
| WO | 2018/220856 A1 | 12/2018 |

OTHER PUBLICATIONS

Notice of Allowance dated Dec. 11, 2020 in Korean Application No. 10-2019-0135428, in 2 pages.
Office Action dated Jun. 24, 2021 in parent U.S. Appl. No. 17/084,305, in 13 pages.

* cited by examiner

SERVER AND METHOD FOR DISPLAYING 3D TOUR COMPARISON

CROSS-REFERENCE TO RELATED APPLICATION

This application is a continuation of U.S. patent application Ser. No. 17/084,305 filed on Oct. 29, 2020, which claims priority to Korean Patent Application No. 10-2019-0135807 filed on Oct. 29, 2019 and Korean Patent Application No. 10-2019-0135428 filed on Oct. 29, 2019 in the Korean Intellectual Property Office, and all the benefits accruing therefrom under 35 U.S.C. 119, the contents of each of which in their entirety are herein incorporated by reference.

BACKGROUND

Field

The described technology relates to a system and method for displaying 3D tour comparisons. As an example, the described technology relates to a system and method for providing an interface for comparing and displaying corresponding images between a plurality of 3D tours. In addition, the described technology relates to a 3D tour photographing apparatus and method capable of performing indoor location tracking and 360-degree spatial photographing at the same time.

This work was supported by Institute of Information & communications Technology Planning & Evaluation (IITP) grant funded by the Korea government(MSIT) (No. 2017-0-00486, Video Enhancement and Transcoder based on the Space Geometry of 360 VR Contents)

Description of the Related Technology

The best way to record a 3D space is to capture omnidirectional 360-degree views of the space and save them in a 360-degree image form, and create a form of a 3D tour by connecting the 360-degree images for each location.

Further, the most efficient way to record a space (e.g., architecture, interior) that changes over time is also to photograph and save the space to be recorded according to a specific point in time in the form of a 3D tour.

Existing interfaces showing 3D images provide only images captured at a specific moment at a specific location in a target place. Therefore, in order to grasp the appearance of the space that had changed over time, there was an inconvenience that users had to find and compare each 3D image corresponding to a specific location captured at different times, one by one.

In addition, since photographing points did not match one another perfectly and photographing directions were also different from one another even when the same space was captured, if a user found and compared corresponding 3D images one by one, there was a problem of causing too much time and effort.

On the other hand, a 3D tour photographing apparatus is used to photograph a 360-degree space. Furthermore, in order to connect 360-degree images and create a 3D tour, it is necessary to find out the points and photographing paths of the 360-degree images to be captured.

In general, in the case of an outdoor space, GPS (Global Positioning System) information can be used to track photographing paths and points. However, since GPS information cannot be used in an indoor space, it is difficult to track photographing points and paths in real time.

Hence, for indoor location tracking, the SLAM (simultaneous localization and mapping) technique can be used to estimate locations and paths moving in real time. Techniques of tracking photographing paths and photographing points at the time of photographing indoor spaces can be advantageously used in various industries.

However, in order to use such SLAM, special equipment such as a tracking camera or the like is needed. In other words, in order to use the SLAM technique, there was an inconvenience of having to prepare a separate location measurement apparatus when photographing a 360-degree space.

Moreover, since a location measurement apparatus was provided separately from an image photographing apparatus for creating a 3D tour, the image capturing and the location measurement were separated from each, and thus, it was difficult for a user to control them at the same time.

In addition, when collecting data for creating a 3D tour, since image photographing and location measurement were separated from each other, there was a problem that error occurred in the location measurement data.

SUMMARY

It is an object of the described technology to provide a system and method for displaying 3D tour comparisons that select images for locations and directions corresponding to one another and display them on a screen at the same time, for a plurality of 3D tours captured at different points in time (i.e., time) in the same space.

Further, it is another object of the described technology to provide a system and method for displaying 3D tour comparisons that provide an interface capable of comparing a plurality of 3D tours, by selecting specific 3D tours out of a plurality of 3D tours captured at different photographing time points and displaying them on a part of a split-screen and at least a part of the rest of the split-screen.

It is yet another object of the described technology to provide a 3D tour photographing apparatus and method capable of reducing errors in location measurement data, by capturing 360-degree images and tracking the location in an indoor space at the same time.

Moreover, it is still another object of the described technology to provide a 3D tour photographing apparatus and method capable of increasing the accuracy of location measurement, by changing the position and angle between a 360-degree image capturing module and a location tracking module using a tilt unit.

In addition, it is a further object of the described technology to provide a 3D tour photographing apparatus and method capable of providing a notification when an error occurs in the location measurement due to insufficient feature points in the data captured by the location tracking module, so that a user can change the location of a location tracking module.

The objects of the described technology are not limited to those mentioned above, and other objects and advantages of the described technology that have not been mentioned can be understood by the following description, and will be more clearly understood by embodiments of the described technology. In addition, it will be readily understood that the objects and advantages of the described technology can be realized by the means and combinations thereof set forth in the claims.

One aspect is a method for displaying a 3D tour comparison performed by a server for displaying a 3D tour comparison operating in conjunction with a user device, the method comprising: setting a first tour serving as a reference for comparison and a second tour to be compared, setting any one of a plurality of image photographing points included in the first tour as a first point, selecting any one closest to the first point out of a plurality of image photographing points included in the second tour as a second point, and displaying an image at the first point of the first tour on a part of a split-screen, and displaying an image at the second point of the second tour on at least a part of the rest of the split-screen, wherein the first tour and the second tour are generated at different times for the same indoor space.

In the above method, wherein the first tour comprises a plurality of 360-degree photographed images photographed, respectively, at the plurality of image photographing points, and wherein a user of the user device can change a direction of the image at the first point of the first tour in a range of 360 degrees.

In the above method, wherein the displaying an image at the second point of the second tour on at least a part of the rest of the split-screen comprises: setting a direction of the image at the first point of the first tour and a direction of the image at the second point of the second tour to be the same.

In the above method, wherein the setting a direction of the image to be the same comprises: receiving a control signal for a direction change of the image at the first point of the first tour, changing the direction of the image at the first point of the first tour based on the control signal, and changing the direction of the image at the second point of the second tour in response to the change in the direction of the image at the first point of the first tour.

In the above method further comprising: setting coordinate values for each of the plurality of image photographing points included in the first tour and the second tour.

In the above method, wherein the selecting any one closest to the first point as a second point comprises: calculating a distance between coordinate values of the first point and coordinate values of each of the plurality of image photographing points included in the second tour, and selecting an image photographing point with a shortest distance calculated out of the plurality of image photographing points included in the second tour as the second point.

In the above method, wherein the displaying an image at the second point of the second tour comprises: displaying a first floor plan, on which the plurality of image photographing points included in the first tour are marked, on a part of the split-screen, and displaying a second floor plan, on which the plurality of image photographing points included in the second tour are marked, on at least a part of the rest of the split-screen.

In the above method, wherein the displaying an image at the second point of the second tour further comprises: displaying a location and a direction of the first point on the first floor plan, and displaying a location and a direction of the second point on the second floor plan.

In the above method, wherein the displaying an image at the second point of the second tour comprises: overlappingly displaying an icon representing a location of another point adjacent to the first point, onto the image at the first point, and overlappingly displaying an icon representing a location of another point adjacent to the second point, onto the image at the second point.

In the above method further comprising: receiving a selection for a third tour to be compared, selecting any one closest to the first point out of a plurality of image photographing points included in the third tour as a third point, and displaying the image at the first point of the first tour on a part of the split-screen, and displaying an image at the third point of the third tour on at least a part of the rest of the split-screen.

Another aspect is a system for displaying a 3D tour comparison, comprising: a processor, and a memory having stored thereon a program executed by the processor, the program comprising: an operation of setting a first tour serving as a reference for comparison and a second tour to be compared, an operation of setting any one of a plurality of image photographing points included in the first tour as a first point, an operation of selecting any one closest to the first point out of a plurality of image photographing points included in the second tour as a second point, and an operation of displaying an image at the first point of the first tour on a part of a split-screen, and displaying an image at the second point of the second tour on at least a part of the rest of the split-screen, wherein the first tour and the second tour are generated at different times for the same indoor space.

In the above system, wherein the program further comprises: an operation of setting a direction of the image at the first point of the first tour and a direction of the image at the second point of the second tour to be the same.

The system and method for displaying 3D tour comparisons in accordance with the described technology can eliminate the inconvenience of a user having to find each corresponding image for a plurality of 3D tours one by one, by selecting images for locations and directions corresponding to one another and displaying them on a screen at the same time, for a plurality of 3D tours captured at different points in time.

Further, the system and method for displaying 3D tour comparisons in accordance with the described technology allow a plurality of 3D tours to be displayed at the same time and 3D tours displayed on at least a part of the rest of the split-screen to be selected and compared according to photographing time points. Thereby, the described technology can make it easy to grasp changes over time of the same space, improving convenience for users.

The 3D tour photographing apparatus and method in accordance with the described technology can reduce errors in measurement data and improve convenience of photographing 3D tours, by capturing 360-degree images and tracking the location in an indoor space at the same time.

Moreover, the 3D tour photographing apparatus and method in accordance with the described technology can improve the accuracy of location measurement, by changing the photographing position and angle between a 360-degree image capturing module and a location tracking module. Further, when 3D tours are not photographed, the camera module and the location tracking module can be stacked and stored, thereby improving the portability of the 3D tour photographing apparatus.

In addition, the 3D tour photographing apparatus in accordance with the described technology can reduce the number of repetitive photographing when producing 3D tours and can improve the reliability of 3D tour data, by providing a notification when it is difficult to accurately measure the location due to insufficient feature points in the data captured by the location tracking module, so as to cause the location of the location tracking module to be changed.

The effects of the described technology are not limited to those described above, and those skilled in the art of the described technology can readily derive various effects of the described technology from the configurations of the described technology.

DETAILED DESCRIPTION

Figure 1:
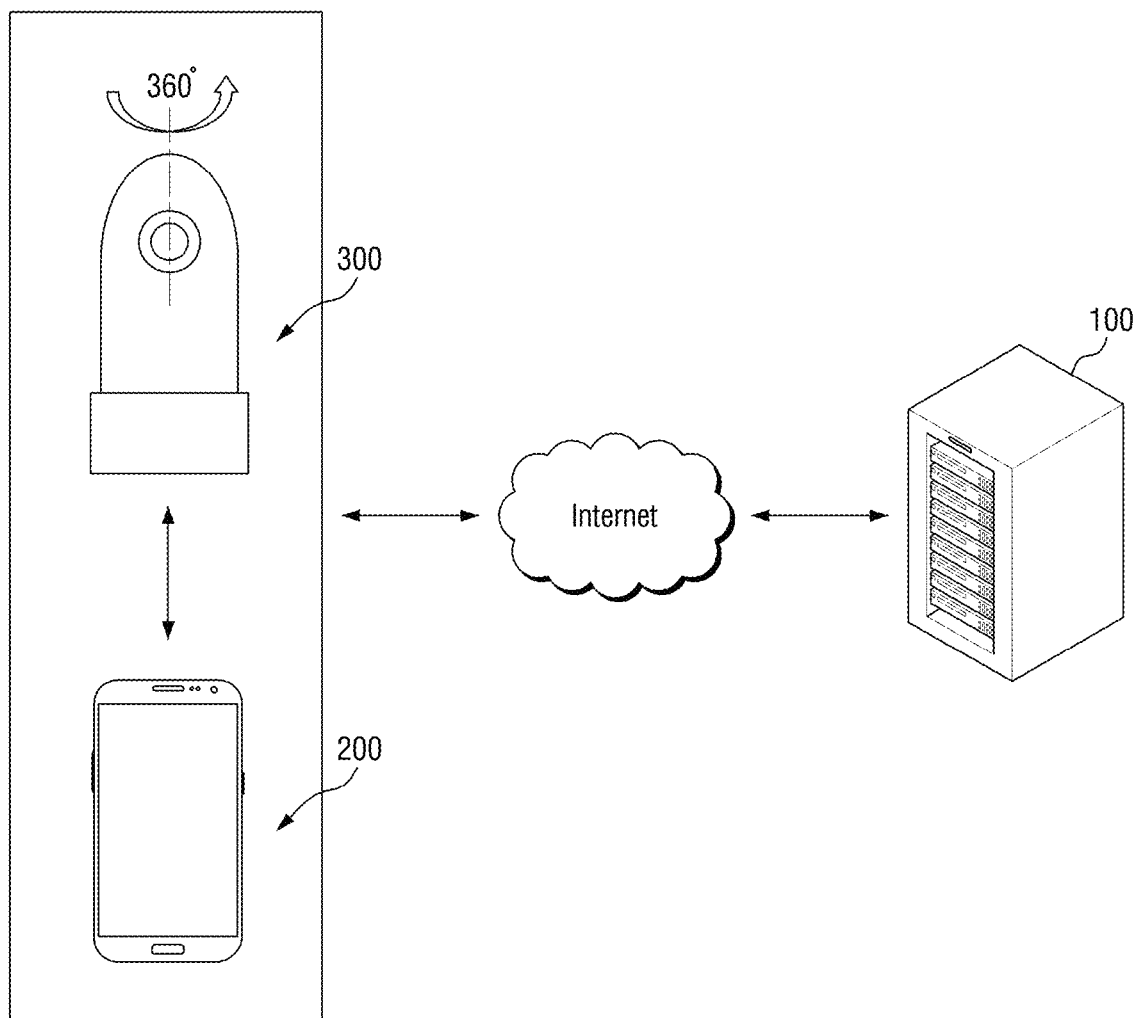
FIG. 1 is a schematic diagram showing a system for displaying 3D tour comparisons in accordance with an embodiment of the described technology.

The advantages and features of the described technology and methods of achieving them will be apparent when reference is made to the embodiments described in detail below in conjunction with the accompanying drawings. However, the described technology is not limited to the embodiments disclosed below but will be implemented in a variety of different forms, the present embodiments merely make the disclosure of the described technology complete and are provided to fully convey the scope of the inventive concept to those having ordinary skill in the art to which the described technology pertains, and the described technology is defined only by the scope of the claims. Like reference numerals refer to like components throughout the specification.

The terms used herein are for describing embodiments and are not intended to limit the described technology. Herein, singular forms also include plural forms unless specifically stated in the context. As used herein, "comprises" and/or "comprising" means that the components, steps, operations, and/or elements mentioned do not preclude the presence or addition of one or more other components, steps, operations and/or elements.

Unless otherwise defined, all terms (including technical and scientific terms) used herein will be used in the sense that can be commonly understood by those of ordinary skill in the art to which the described technology pertains. Further, terms defined in commonly used dictionaries are not to be interpreted ideally or excessively unless explicitly defined specifically.

A 3D tour photographing apparatus is an apparatus capable of creating surrounding background information into an image using one or two or more wide-angle lenses. The 3D tour photographing apparatus captures 360-degree s horizontally and vertically in all directions and creates 360-degree photos and videos. Photos and videos captured by the 3D tour photographing apparatus can be transmitted to and received from various places such as servers and user devices.

In the described technology, a '3D tour' may comprise a combination of images (e.g., panoramic images) captured respectively at 360 degrees at a plurality of points and saved. In this case, the '3D tour' may include location information in which each image is captured, and each location information may be mapped onto a floor plan and provided to users.

In addition, 'a tour serving as a reference for comparison' (e.g., a first tour) and 'a tour to be compared' (e.g., a second tour) in the present invention may be generated and used based on data captured at different times for the same indoor space.

Hereinafter, a system and method for displaying 3D tour comparisons in accordance with an embodiment of the described technology will be described in detail with reference to the drawings.

FIG. 1 is a schematic diagram showing a system for displaying 3D tour comparisons in accordance with an embodiment of the described technology.

Referring to FIG. 1, a system for displaying 3D tour comparisons in accordance with some embodiments of the described technology comprises a server 100, a user device 200, and a 3D tour photographing apparatus 300.

The server 100 and the user device 200 may be implemented as a server-client system. In this case, the server 100 may select an image corresponding to a specific point of the 3D tour selected by a user and provide it to the user device 200. The server 100 may transmit and receive data to and from the user device 200 via a wired or wireless network.

The 3D tour photographing apparatus 300 may transmit and receive data to and from the server 100 via the user device 200. However, the described technology is not limited thereto, and the 3D tour photographing apparatus 300 may directly transmit and receive data to and from the server 100 through a network.

Although only one user device 200 and one 3D tour photographing apparatus 300 are shown in the drawing, the described technology is not limited thereto, and the server 100 may operate in conjunction with a plurality of user devices 200 and 3D tour photographing apparatuses 300.

The server 100 may store and manage a plurality of 3D tours. The server 100 may provide two or more 3D tours selected by the user to the user device 200. At this time, the server 100 may display images for the two or more 3D tours on a split-screen at the same time.

In this case, the server 100 may operate so that the image for the 3D tour displayed on a part of a split-screen (hereinafter, referred to as a first tour) and the image for the 3D tour displayed on at least a part of the rest of the split-screen (hereinafter, referred to as a second tour) are similar.

As an example, the server 100 may select an image corresponding to the image set by the user based on the coordinate values of the images collected via the 3D tour photographing apparatus 300, and provide it to the user device 200. That is, the server 100 may use the coordinate value for the photographing point of the image of the first tour displayed on a part of the split-screen to select an image for the second tour corresponding thereto. A detailed description of a method of selecting images corresponding to each other on a part of the split-screen and on at least a part of the rest of the split-screen using the coordinate values will be described in detail below.

Hereinafter, each component included in the system for displaying 3D tour comparisons in accordance with an embodiment of the described technology will be described in detail.

Figure 2:
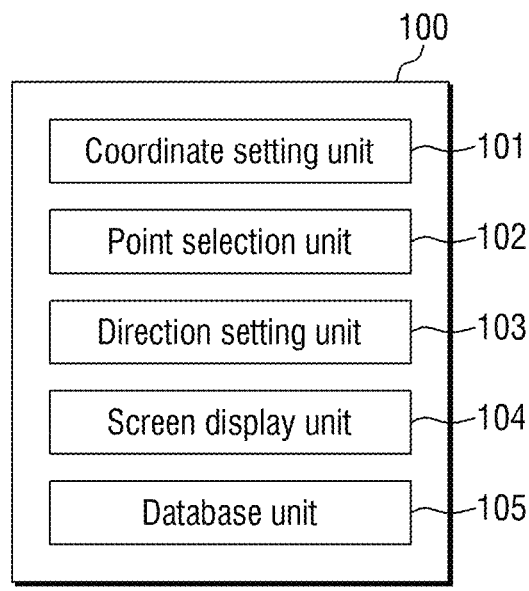
FIG. 2 is a block diagram for illustrating the components of a server for displaying 3D tour comparisons of FIG. 1.

FIG. 2 is a block diagram for illustrating the components of a server for displaying 3D tour comparisons of FIG. 1.

Referring to FIG. 2, the server 100 in accordance with an embodiment of the described technology comprises a coordinate setting unit 101, a point selection unit 102, a direction setting unit 103, a screen display unit 104, and a database unit 105.

The coordinate setting unit 101 may set respective reference points for a plurality of 3D tours. The coordinate setting unit 101 may set a coordinate value for each image photographing point included in the 3D tour based on the respective set reference points. In this case, the coordinate setting unit 101 may set coordinate values using various types of coordinate axes (e.g., a rectangular coordinate system or a spherical coordinate system). The coordinate values set by the coordinate setting unit 101 may be used to select images of photographing points corresponding to each other for different 3D tours.

The point selection unit 102 may calculate distances, respectively, between the coordinate value of a specific image photographing point (e.g., a first point) for a tour (e.g., a first tour) that serves as a reference for comparison and all coordinate values of a plurality of image photographing points included in a tour (e.g., a second tour) to be compared. The point selection unit 102 may select a point having the shortest calculated distance as an image photographing point (e.g., a second point) for the tour to be compared (e.g., the second tour).

The direction setting unit 103 matches the image direction of the tour (e.g., the first tour) that serves as a reference for comparison displayed on a part of the split-screen of the screen with the image direction of the tour (e.g., the second tour) to be compared. That is, the direction setting unit 103 may synchronize a first direction with respect to the first point of the first tour and a second direction with respect to the second point of the second tour.

The screen display unit 104 may display a plurality of different 3D tours to be compared by the user on the split-screen at the same time. For instance, an image at the first point of the tour serving as a reference for comparison (e.g., a first tour) may be displayed on a part of the split-screen, and an image at the second point of the tour to be compared (e.g., a second tour) may be displayed on at least a part of the rest of the split-screen. The details of this will be described later below.

The database unit 105 may store and manage data related to a plurality of 3D tours captured at different points in time. In this case, the database unit 105 may store captured images, photographing dates, photographing locations, and the like for each tour.

Although not explicitly shown in the drawings, the server 100 in accordance with an embodiment of the described technology may further comprise a communication unit (not shown) that communicates with the user device 200 and the 3D tour photographing apparatus 300. In this case, the server 100 may transmit and receive data to and from other external devices based on various communication protocols.

Hereinafter, the configuration of a system for displaying 3D tour comparisons 1000 in accordance with another embodiment of the described technology will be described in detail.

Figure 3:
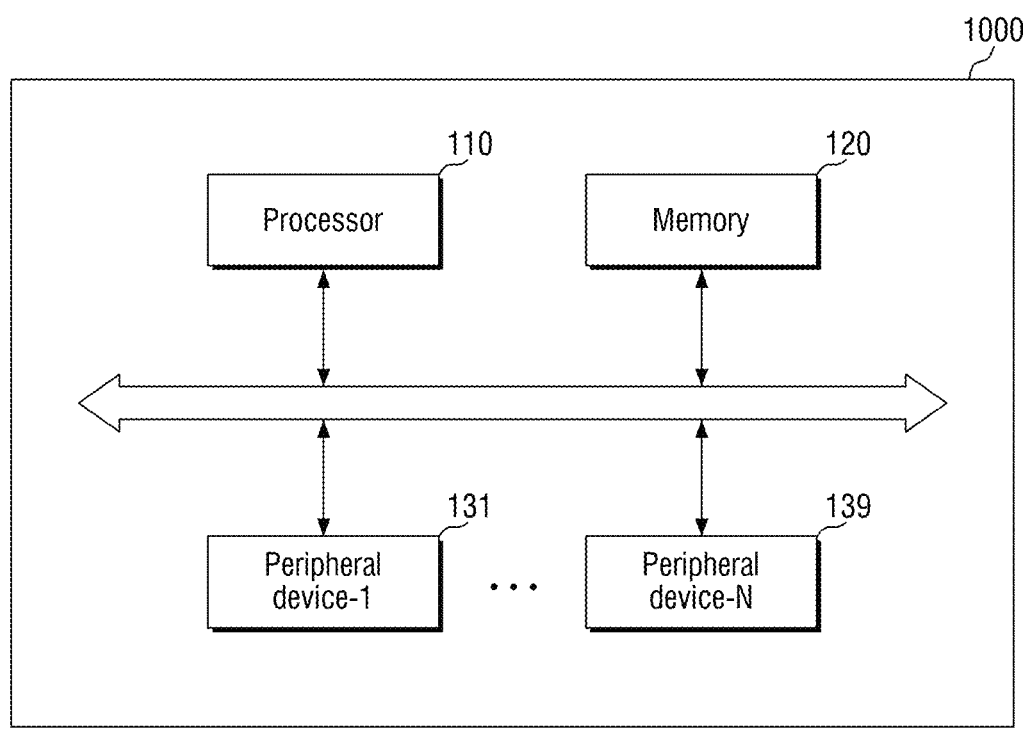
FIG. 3 is a block diagram for illustrating a schematic configuration of a system for displaying 3D tour comparisons in accordance with another embodiment of the described technology.

FIG. 3 is a block diagram for illustrating a schematic configuration of a system for displaying 3D tour comparisons in accordance with another embodiment of the described technology.

Referring to FIG. 3, the system for displaying 3D tour comparisons 1000 in accordance with another embodiment of the described technology comprises a memory 120 having stored thereon a program for implementing the technical idea of the described technology, and a processor 110 for executing the program stored in the memory 120.

At this time, the processor 110 sets the same reference points respectively in the same floor plan for the first tour that serves as the reference for comparison and the second tour to be compared, and sets each coordinate value for the reference points. In this case, the first tour and the second tour are different tours from each other including images captured at different points in time.

The processor 110 sets a first point out of a plurality of image photographing points included in the first tour, and compares the coordinate value of the first point and the coordinate values of a plurality of image photographing points included in the second tour.

The processor 110 selects an image photographing point in the second tour having the shortest distance from the coordinate value of the first point, as a second point.

The processor 110 displays the image of the first point on a part of a split-screen of the split-screen and the image of the second point on at least a part of the rest of the split-screen. The operation of such a processor 110 may be performed by using a program composed of a plurality of preset operations.

In this case, the data related to a plurality of 3D tours captured at a plurality of points in time may be stored in the memory 120. For example, each 3D tour may include photographing time points (e.g., photographing dates), a plurality of 360-degree images captured at photographing time points, coordinates of the photographing locations for the respective images captured, and floor plans onto which corresponding coordinates are mapped.

Further, an algorithm for a method for displaying 3D tour comparisons may be stored in the memory 120. Here, the method for displaying 3D tour comparisons refers to a method of providing an interface for simultaneously displaying a plurality of 3D tours on a split-screen. In this case, the processor 110 may be the execution subject for the corresponding algorithm.

On the other hand, the system for displaying 3D tour comparisons 1000 may provide an interface for 3D tour comparisons that selects images for locations and directions corresponding to one another and displays them on a screen at the same time, for a plurality of 3D tours captured at different points in time (i.e., dates) in the same space.

In this case, the system for displaying 3D tour comparisons 1000 may provide an interface that selects a point in another second 3D tour closest to the point of the first 3D tour displayed in the first area, synchronizes their directions, and displays images for the respective different 3D tours on a screen at the same time.

Moreover, the system for displaying 3D tour comparisons 1000 may provide an interface capable of selecting, comparing, and displaying the photographing time points of a plurality of 3D tour images within a split-screen.

Additionally, the processor 110 may be referred to as different names such as a CPU and a mobile processor, depending on the implementations of the system for displaying 3D tour comparisons 1000.

The memory 120 may be implemented in any form of storage device that can store a program and can be accessed by the processor to run the program. Depending on hardware implementations, the memory 120 may be implemented in a plurality of storage devices instead of one storage device. Further, the memory 120 may comprise not only a main storage device but also a temporary storage device. In addition, the memory 120 may also be implemented in a volatile memory or a nonvolatile memory, and may be defined as including all forms of information storage means implemented so that a program can be stored and run by a processor.

Moreover, the system for displaying 3D tour comparisons 1000 may be implemented in various ways such as a web server, a computer, a mobile phone, a tablet, a TV, and a set-top box, depending on the embodiments, and may be defined as including any forms of data processing device capable of performing the functions defined herein.

The system for displaying 3D tour comparisons 1000 may further comprise various peripheral devices (e.g., peripheral device-1 131 to peripheral device-N 139) depending on embodiments. For example, the system for displaying 3D tour comparisons 1000 may further comprise peripheral devices such as a 3D tour photographing apparatus 300, a keyboard, a monitor, a graphics card, and a communication device.

Hereinafter, a method for displaying 3D tour comparisons performed in the server 100 of FIG. 1 will be described as an example for the convenience of description.

Figure 4:
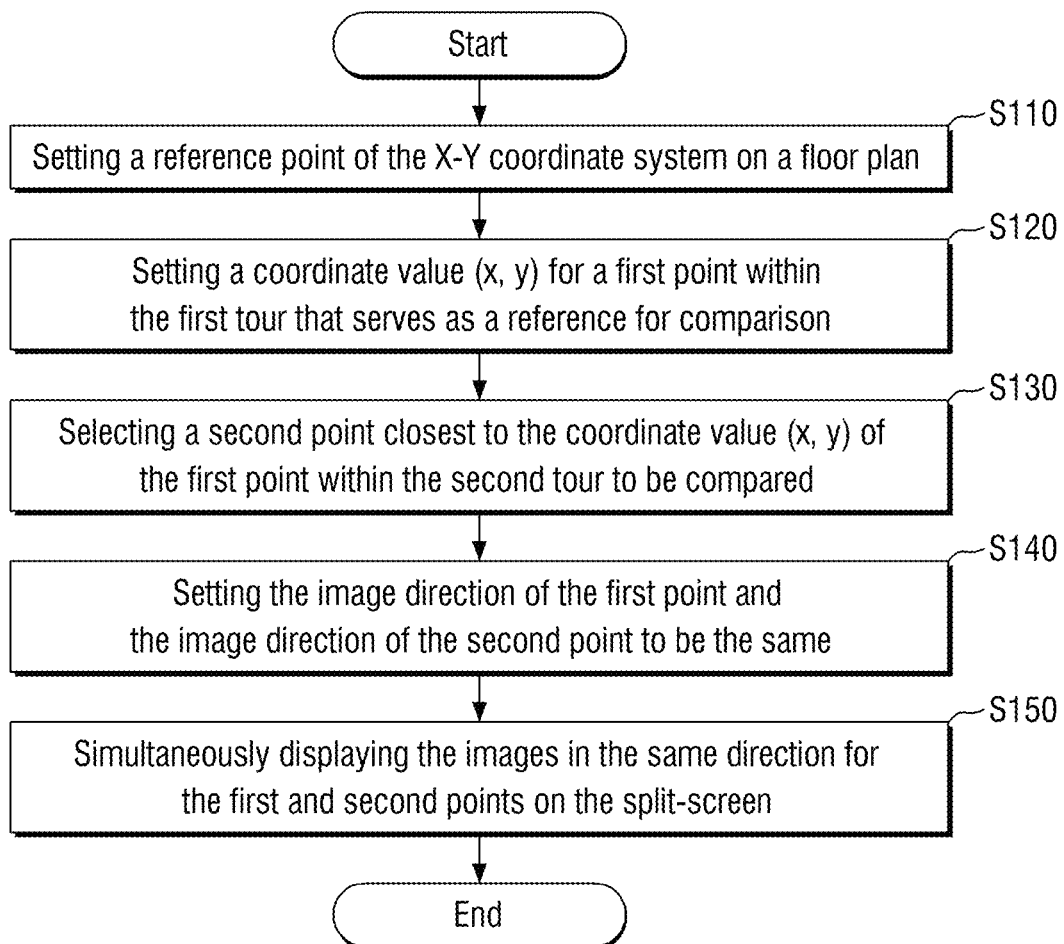
FIG. 4 is a flowchart for illustrating a method for displaying 3D tour comparisons in accordance with some embodiments of the described technology.

FIG. 4 is a flowchart for illustrating a method for displaying 3D tour comparisons in accordance with some embodiments of the described technology.

Referring to FIG. 4, in the method for displaying 3D tour comparisons in accordance with an embodiment of the described technology, first, a server 100 sets a reference point on the same floor plan included in different tours included in 3D tour (S110).

At this time, the scale between the images and the reference points for all 3D tours to be compared must have the same value. To this end, the server 100 may unify reference points for a plurality of 3D tours including the same floor plan. Here, the reference point may be automatically set on the same floor plan, or may be set based on a coordinate system set manually by a user. The server 100 may set a reference point based on the X-Y coordinate system, but can use various coordinate systems as necessary.

In addition, the server 100 may resize the images having the same floor plan to have the same size.

The server 100 may allow the user to select a first tour that serves a reference for comparison and a second tour to be compared via a user device 200. In this case, the first tour and the second tour that are different from each other may comprise a plurality of images captured at different photographing time points in the same space.

The server 100 sets a coordinate value for a first point included in the first tour that serves as the reference for comparison (S120). In this case, the coordinate value of the first point may be set by selecting a specific image photographing point to be compared by the user through the floor plan in the first tour.

The server 100 selects a second point closest to the coordinate value of the first point within the second tour to be compared (S130). The server 100 may calculate and compare respectively the distances between the coordinate value of the first point selected in step S120 and all the coordinate values of the respective image photographing points included in the second tour, and select the image photographing point whose calculated distance is the shortest from the first point as the second point.

The server 100 sets the direction of the image captured at the first point and the direction of the image captured at the second point to be the same (S140). In other words, the directions of the image for the first point and the image for the second point may be synchronized with each other.

The server 100 displays the images in the same direction for the first point and the second point on the split-screen at the same time (S150). Accordingly, the server 100 may select and display the image of the second tour having the highest matching probability with the image selected at the first point of the first tour.

If the user changes the location and direction of the first point of the first tour, the server 100 may select and display an image of the second tour corresponding to the location and direction that have been changed.

If the user changes the viewpoint direction for the first point, the server 100 will receive a control signal for a direction change from the user device 200. In this case, the server 100 changes the direction of the first point based on the inputted control signal, and the second direction of the second point may be changed in synchronization with the change of the direction of the first point.

This can also be applied when the location and direction of the second tour are changed. In other words, if the user changes the location and direction of the second tour, the server 100 may select and display an image of the first tour corresponding to the changed location and direction using the received control signal. The application of these changes can be applied in real time. That is, the first tour and the second tour may be synchronized with each other, so that changes made according to the user's input may be updated and displayed in real time.

Figure 5:
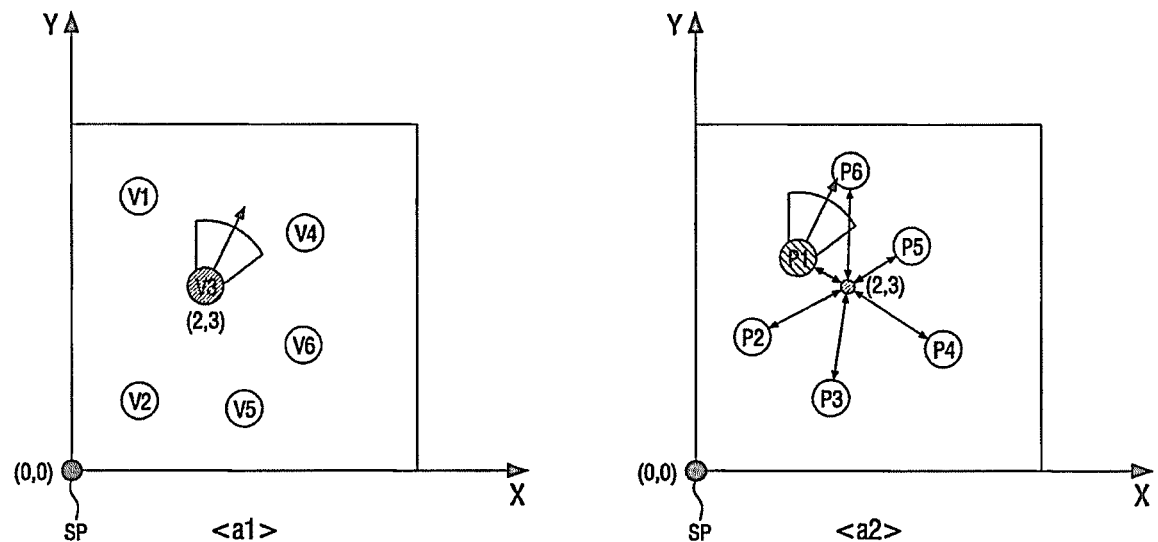
FIG. 5 is a diagram for illustrating a method of synchronizing the positions and directions of different 3D tours in a system for displaying 3D tour comparisons in accordance with some embodiments of the described technology.

FIG. 5 is a diagram for illustrating a method of synchronizing the positions and directions of different 3D tours in a server for displaying 3D tour comparisons in accordance with some embodiments of the described technology. In FIG. 5, the method for displaying 3D tour comparisons described in relation to in FIG. 4 will be illustrated and briefly described.

Here, <a1> of FIG. 5 represents a first tour comprising a plurality of image photographing points (e.g., V1 to V6), and <a2> represents a second tour including a plurality of image photographing points (e.g., P1 to P6).

Referring to FIG. 5, the server 100 may mark each of a plurality of image photographing points (e.g., V1 to V6) on a floor plan of the first tour, and set a reference point SP in the floor plan.

Similarly, the server 100 may mark each of a plurality of image photographing points (e.g., P1 to P6) on a floor plan of the second tour, and set the same reference point SP for the floor plan of the second tour as the first tour.

Thereafter, if the user selects a specific point V3 within the first tour that serves as the reference for comparison, the server 100 calculates the coordinate value for the first point V3 (hereinafter, for example, (2,3)) with reference to the reference point SP. Further, the server 100 derives the direction of the first point V3 specified by the user.

The server 100 may calculate the distances respectively between the coordinate value (2, 3) of the selected first point V3 and the coordinate values of the plurality of image photographing points (e.g., P1 to P6) included in the second tour, and set the point having the shortest distance from the coordinate value (2, 3) of the first point V3 as a second point P1.

The server 100 matches the direction viewed by the user at the first point V3 and the direction viewed by the user at the second point P1.

The server 100 may display an image for the first direction of the first point V3 on a part of a split-screen (i.e., a first area) of the split-screen, and an image for the second direction of the second point P1 on at least a part of the rest of the split-screen (i.e., a second area) of the screen.

As a result, the server 100 of the described technology may select images for locations and directions corresponding to one another and display them on a screen at the same time, for a plurality of 3D tours captured at different points in time. Thereby, the server 100 of the described technology can eliminate the inconvenience of a user having to find each corresponding image for a plurality of 3D tours one by one.

Figure 6:
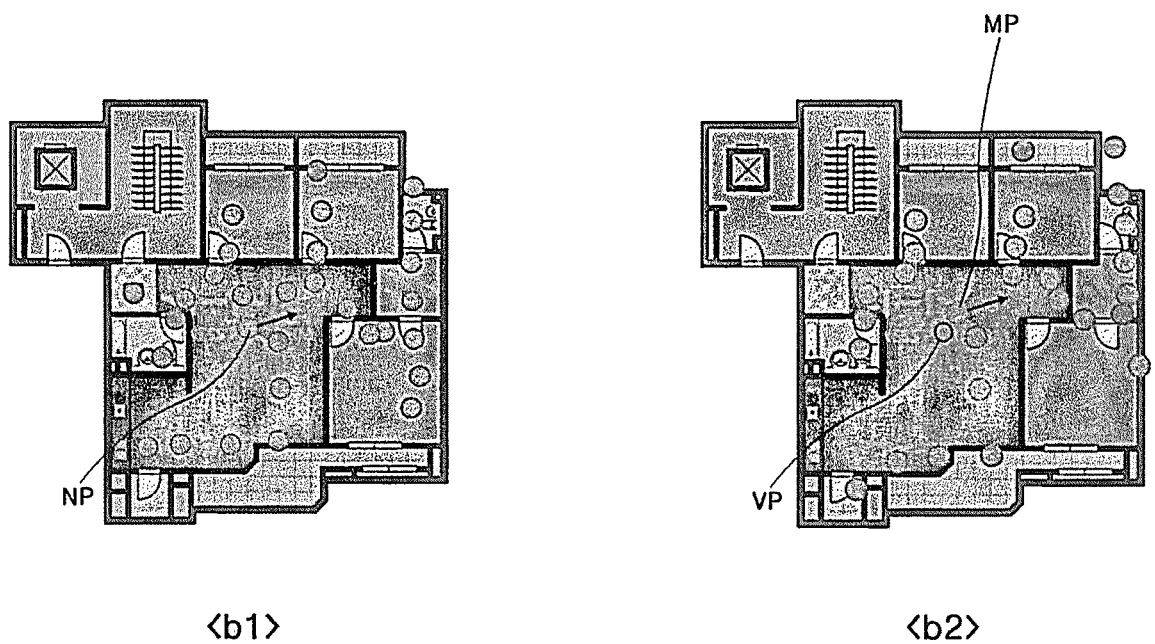
FIGS. 6 and 7 are diagrams for illustrating an example of an interface for 3D tour comparisons provided by a system for displaying 3D tour comparisons in accordance with some embodiments of the described technology.
Figure 7:
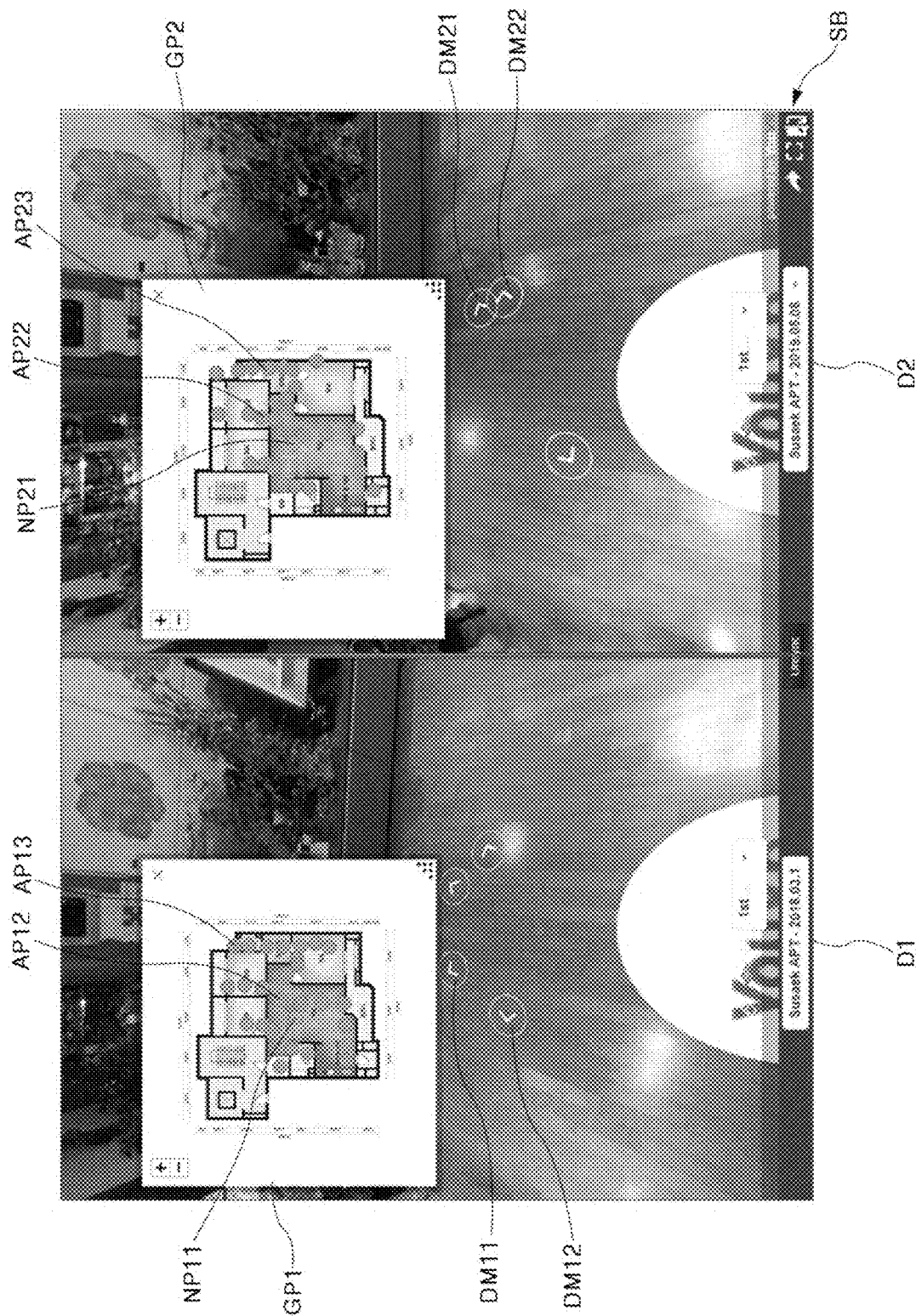

FIGS. 6 and 7 are diagrams for illustrating an example of an interface for 3D tour comparisons provided by a server for displaying 3D tour comparisons in accordance with some embodiments of the described technology. Here, FIG. 6 shows respective floor plans for a plurality of 3D tours, and FIG. 7 is a diagram for comparing and displaying images of corresponding positions and directions in a plurality of 3D tours.

Referring to FIG. 6, a first tour and a second tour may comprise a plurality of image photographing points captured at different times for the same place. Each of the plurality of image photographing points may be marked on the floor plans of the first tour and the second tour, respectively.

Referring to <b1>, a user may select an arbitrary first point NP in the set first tour.

Next, referring to <b2>, the server 100 may set a location coordinate VP within the second tour, having the same coordinate value as the coordinate value of the first point NP selected in the first tour.

The server 100 may calculate the distances respectively between the set location coordinate VP and the coordinate values for all the points in the second tour, and select the point MP in the second tour having the shortest distance as a second point.

The server 100 may set the direction of the first image for the first point NP and the direction of the second image for the second point MP to be the same.

As an example, referring to FIG. 7, the server 100 may display the first image for the first point and the second image for the second point set in FIG. 6 on the split-screen at the same time.

In other words, the server 100 may display the first image for the first point on a first area D1 of the split-screen, and the second image for the second point on a second area D2 of the split-screen.

In this case, the second image for the second point within the second tour may be an image having the highest degree of relevance to the first image for the first point. For example, the second image may exhibit the highest matching probability with the components included in the first image.

Icons indicating the locations of different image photographing points within each tour may be displayed on each tour screen. For example, the server 100 may display an image for the first point of the first tour displayed on the first area D1.

In this case, a first icon DM11 indicating the location and direction of another point adjacent to the first point and a second icon DM12 indicating the location and direction of yet another point may be displayed overlappingly on the image for the first point.

Similarly, a third icon DM21 indicating the location and direction of another point adjacent to the second point and a fourth icon DM22 indicating the location and direction of yet another point may be displayed overlappingly, on the image for the second point of the second tour displayed in the second area D2.

If the user presses a particular icon, the screen of the tour in question may be moved to the image photographing point corresponding to that icon, and an image corresponding to that image photographing point may be displayed on the screen. Thereafter, the user can freely change the direction viewed from the photographing point within a range of 360 degrees.

The server 100 may use the method for displaying 3D tour comparisons described above to change the point of the tour to be compared (that is, the tour displayed on at least a part of the rest of the split-screen) together so as to match to the changed photographing point of the tour serving as the reference for comparison. Furthermore, the server 100 may also change the direction of the image viewed from that point in the same manner.

On the other hand, the server 100 may display floor plans, on which a plurality of image photographing points included in the first tour and the second tour are marked, on each of the split-screen.

For example, a first floor plan GP1 for the first image of the first tour may be displayed in the first area D1 on the split-screen. The location and direction for the first point NP11 displayed on the screen may be displayed on the first floor plan GP1. In addition, other image photographing points AP12 and AP13 included in the first tour may also be displayed on the first floor plan GP1.

A second floor plan GP2 for the second image of the second tour may be displayed in the second area D2 on the split-screen. Similarly, the location and direction for the second point NP21 may be displayed on the second floor plan GP2. Furthermore, other image photographing points AP22 and AP23 included in the second tour may also be displayed on the second floor plan GP2.

In this case, the image point selected by the user may be represented differently in color, shape, and size compared to other surrounding points on the floor plan.

In addition, the server 100 displays a menu bar SB on a part of the split-screen of the split-screen. The user may use the menu bar SB to select and display tours to be compared out of a plurality of 3D tours. A method of changing 3D tours will be described later in detail with reference to FIG. 8.

FIG. 7 shows an example of displaying images for respective tours captured at different times on a screen split into two. However, the described technology is not limited thereto, and a split-screen may be configured by changing two or more sub-screens to different sizes and arrangements. Furthermore, although not explicitly shown in the drawings, the configuration and size of the split-screen can be changed by users, and the server 100 may provide an interface that allows such an interface screen to be modified to suit the needs of users.

Figure 8:
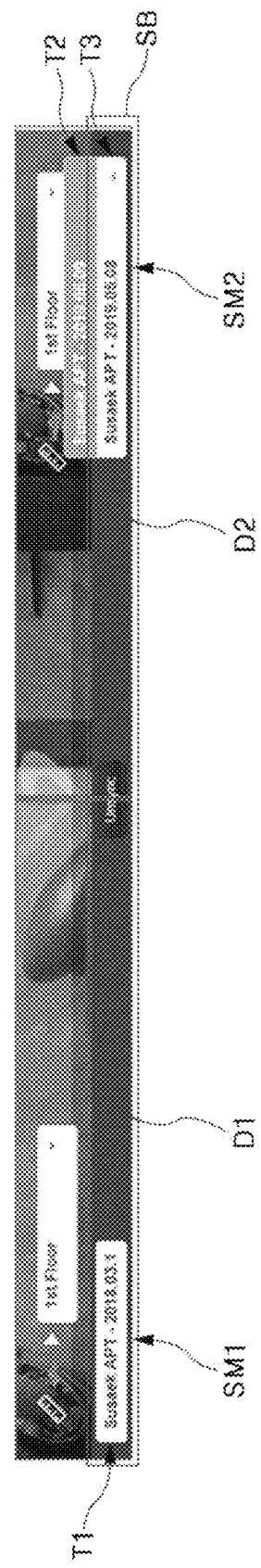
FIG. 8 is a diagram for illustrating a function of changing photographing time points in an interface for 3D tour comparisons in accordance with some embodiments of the described technology.

FIG. 8 is a diagram for illustrating a function of changing photographing time points in an interface for 3D tour comparisons in accordance with some embodiments of the described technology.

Referring to FIG. 8, the server 100 may provide a comparison split-screen according to photographing time points. In this case, a user may select a plurality of 3D tours to be displayed on each of the split-screen.

A button for allowing the selection of the type of 3D tours is provided on a part of the split-screen of each screen, and the user may press a corresponding button to select one of a plurality of pre-stored 3D tours. Each of the 3D tours was captured at different points in time, and the user may select a tour captured at a point in time serving as the reference for comparison and a tour captured at a point in time to be compared and allow them to be displayed on one screen.

The server 100 may display a menu bar SB, including a 3D tour selection menu (SM1 and SM2, respectively) for allowing the selection of different 3D tours, on a part of the split-screen of the screen.

As an example, a first selection menu SM1 for allowing the selection of a tour serving as the reference for comparison may be displayed at the bottom of the first area D1 of the split-screen. For example, the user may select a first tour T1(that is, a tour serving as the reference for comparison) for a first photographing time point (e.g., Mar. 1, 2018) in the first selection menu SM1. At this time, an image included in the first tour may be displayed on the first area D1. Further, a second selection menu SM2 for allowing the selection of a tour to be compared may be displayed at the bottom of the second area D2 of the split-screen. For example, a second tour T2 or a third tour T3 for a second or third photographing time point (e.g., May 8, 2019 or May 9, 2019) may be selected in the second selection menu SM2.

In addition, if the tour to be compared is changed, the system for displaying 3D tour comparisons 1000 may select and display an image photographing point of the tour to be compared corresponding to the image photographing point and direction of the tour serving as the reference for comparison.

For example, after the first tour T1 is set for the first area D1, if the user selects the third tour T3 for the second area D2, the server 100 calculates the distances between the coordinate value of the first point displayed in the first area D1 and the coordinate values of the plurality of image photographing points included in the third tour T3. Thereafter, an image photographing point with the shortest calculated distance in the third tour T3 may be selected as a third point, and an image for the third point may be displayed in the second area D2. However, this is only one example, and the described technology is not limited thereto.

Figure 9:
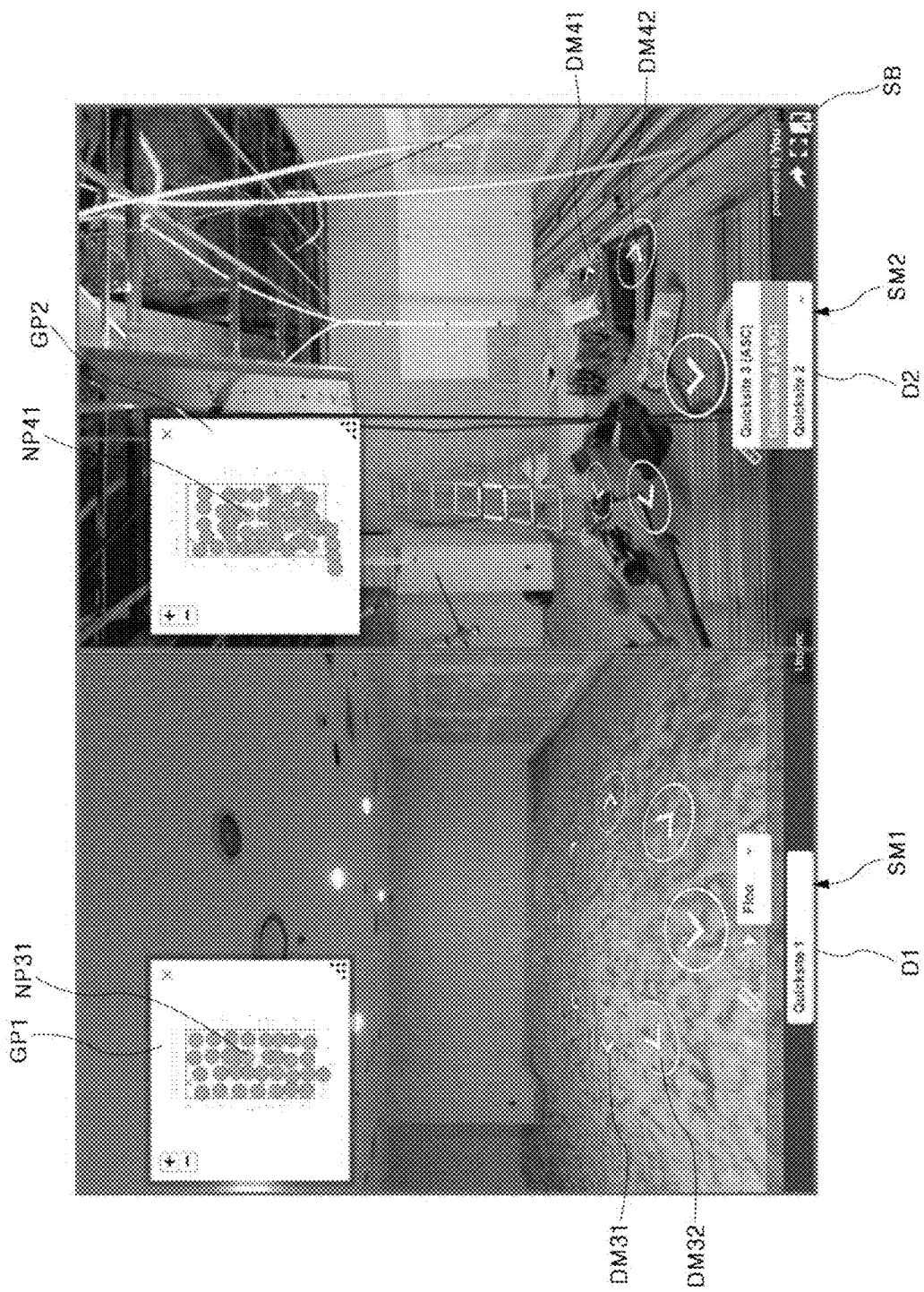
FIG. 9 is a diagram for illustrating another example of an interface for 3D tour comparisons provided by a system for displaying 3D tour comparisons in accordance with some embodiments of the described technology.

FIG. 9 is a diagram for illustrating another example of an interface for 3D tour comparisons provided by a server 100 in accordance with some embodiments of the described technology. The method for displaying 3D tour comparisons of the described technology may be advantageously utilized to grasp the construction progress of a building construction site.

For example, referring to FIG. 9, a first tour of an image capturing the inside of a building before construction is carried out may be displayed in a first area D1 of an interface for 3D tour comparison, and a second tour of images capturing the inside of the building at several points in time after the construction is carried out may be displayed in a second area D2.

A menu bar SB including first and second selection menus SM1 and SM2 for allowing the selection of any one of a plurality of tours captured at different points in time may be arranged at the bottom of the split-screen, and the user can freely select 3D tours captured at a desired point in time via the first and second selection menus SM1 and SM2.

A floor plan may be displayed on each 3D tour. A first floor plan GP1 for a first tour may be displayed on the first area D1, and a second floor plan GP2 for a second tour may be displayed on the second area D2.

If a first point NP31 is selected on the first floor plan GP1 for the first tour, the location and direction of the first point NP31 may be marked on the first floor plan GP1. At this time, the server 100 may set the reference points for the first tour and the second tour to be the same for the same floor plan within the second tour.

The coordinate value of the first point NP31 and the coordinate values of the plurality of image photographing points included in the second tour may be calculated, respectively, and the coordinate value with the shortest calculated distance may be selected as the second point NP41.

The server 100 may match the direction viewed from the first point NP31 and the direction viewed from the second point NP41 and display images corresponding to each other on the screen at the same time. Further, if the user changes the direction for the first point NP31, the server 100 may change the first direction of the first point NP31 based on a control signal inputted by the user, and may also change the second direction together in synchronization with the change in the first direction. As a result, the user of the described technology can readily check and compare the progress of the construction of the building.

In summary, the system and method for displaying 3D tour comparisons in accordance with the described technology can eliminate the inconvenience of a user having to find each corresponding image for a plurality of 3D tours one by one, by selecting images for locations and directions corresponding to one another and displaying them on a screen at the same time, for a plurality of 3D tours captured at different points in time.

In addition, the system and method for displaying 3D tour comparisons in accordance with the described technology allow a plurality of 3D tours to be displayed at the same time and 3D tours displayed on at least a part of the rest of the split-screen to be selected and compared according to photographing time points. Thereby, the described technology can make it easy to grasp changes over time of the same space, improving convenience for users.

On the other hand, techniques of tracking photographing paths and photographing points at the time of photographing indoor spaces can be advantageously used in various industries. Since construction, interior, facility management, factories, etc., fall within an industry that is mainly carried out in indoor spaces where GPS information cannot be received, useful space management data can be obtained if locations of the indoor space can be tracked and photographed together.

In the described technology, the SLAM (simultaneous localization and mapping) technique can be used to estimate the location and path of the 3D tour photographing apparatus for indoor location tracking.

In addition, as described above, a '3D tour' in the described technology may comprise a combination of images (e.g., panoramic images) captured respectively at 360 degrees at a plurality of points and saved. In this case, the '3D tour' may include each of the location information and direction information in which a plurality of images are captured.

Here, each location information may be mapped onto a floor plan and provided to users. Further, the location information and direction information derived while moving for photographing 3D tours may be used to derive movement paths, and the movement paths derived may be displayed on user devices.

In this case, the images captured at 360 degrees and the location information and direction information at which the images are captured may be acquired through a 3D tour photographing apparatus and method of the described technology to be described later.

Hereinafter, a 3D tour photographing apparatus and a method of operating the same in accordance with an embodiment of the described technology will be described in detail with reference to the drawings.

Figure 10:
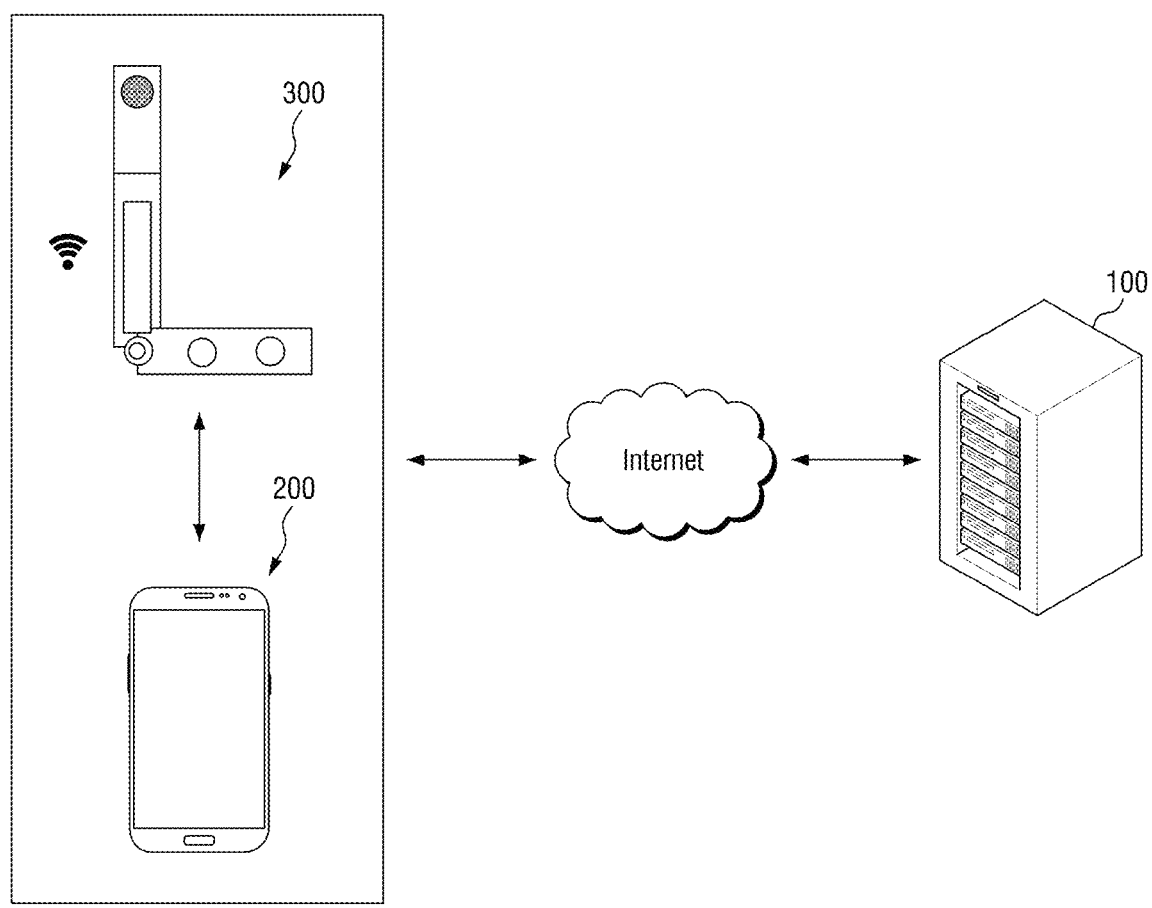
FIG. 10 is a diagram schematically showing a 3D tour photographing system in accordance with another embodiment of the described technology.

FIG. 10 is a diagram schematically showing a 3D tour photographing system in accordance with another embodiment of the described technology.

Referring to FIG. 10, a 3D tour photographing system in accordance with an embodiment of the described technology may comprise a 3D tour photographing apparatus 300, a user device 200, and a server 100.

In embodiments of the described technology, the user device 200 may refer to a mobile electronic device that can have a unique identification number, such as a mobile phone, a smartphone, and a wearable device (e.g., a watch-type device, etc.). Here, of course, the operating system (OS) of the user device 200 is not limited to a particular operating system (e.g., iOS or Android operating system).

In addition, the user device 200 may comprise an input unit for receiving a user input, a display unit for displaying visual information, a communication unit for transmitting and receiving signals to and from the outside, and a control unit for processing data, controlling each unit inside the user device 200, and controlling data transmission/reception between the units. Hereinafter, what the control unit performs inside the user device 200 according to a user's command is collectively referred to as what the user device 200 performs.

In an embodiment of the described technology, the user device 200 may receive captured images, location information and direction information thereof from the 3D tour photographing apparatus 300 through an application installed thereon.

Further, the user device 200 may display a notification received from the 3D tour photographing apparatus 300. Here, the user device 200 may provide the user with a notification received through a pre-installed application.

In an embodiment of the described technology, the user device 200 may transmit and receive radio signals to and from at least one of the 3D tour photographing apparatus 300 and the server 100 over a mobile communications network established according to technical standards or communication methods for mobile communication via the communication unit. In an embodiment of the described technology, the user device 200 may transmit a signal inputted by the user to the 3D tour photographing apparatus 300, and may receive 3D tours and notifications from the 3D tour photographing apparatus 300 through applications installed on the user device 200.

In an embodiment of the described technology, the 3D tour photographing apparatus 300 may capture an image for a particular point and then collect feature points and location information for the captured image. The 3D tour photographing apparatus 300 may create a 3D tour using the collected data. The data collected by the 3D tour photographing apparatus 300 may be transmitted to and received from the user device 200 and the server 100.

If the 3D tour photographing apparatus 300 is deficient in feature points for the captured image, the 3D tour photographing apparatus 300 may provide a notification apprising that the position or angle between a camera module 310 and a location tracking module 320 needs to be adjusted, via a notification unit 350 or the user device 200 provided in that apparatus.

In an embodiment of the described technology, the server 100 may manage and store the data received from the 3D tour photographing apparatus 300, and the data stored may be shared with the 3D tour photographing apparatus 300 and the user device 200. Here, the server 100 may be a computer system for providing information or services to clients via a communications network, and may refer to a computer (server program) or a device.

In this case, the server 100 may be directly operated or managed by a particular company or individual or contracted out, or may be operated by the same entity. Moreover, the functions performed by the server 100 may, of course, be performed separately by a plurality of servers.

Hereinafter, a 3D tour photographing apparatus 300 and method in accordance with embodiments of the described technology will be described in detail.

Figure 11:
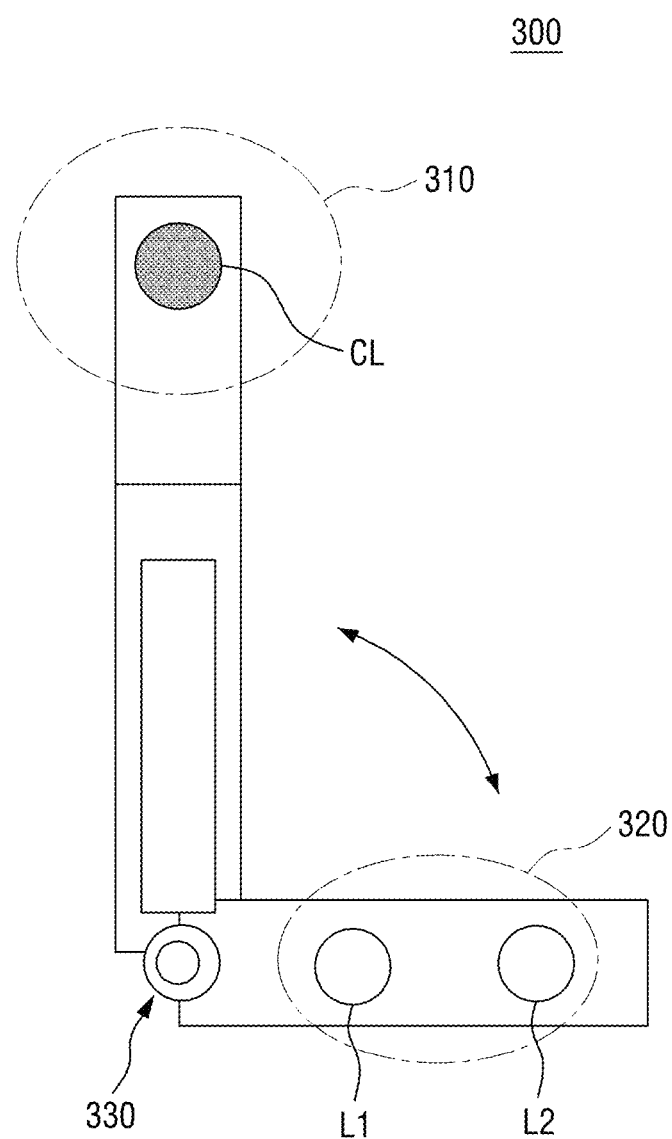
FIG. 11 is a diagram showing a 3D tour photographing apparatus in accordance with an embodiment of the described technology.

FIG. 11 is a diagram showing a 3D tour photographing apparatus in accordance with an embodiment of the described technology.

Referring to FIG. 11, a 3D tour photographing apparatus 300 in accordance with an embodiment of the described technology comprises a camera module 310, a location tracking module 320, and a tilt unit 330.

The camera module 310 is an apparatus capable of photographing surroundings at 360 degrees. The camera module 310 may store an image capturing surroundings at a particular angle at a particular point. In this case, captured images may be stored in an around-view format (e.g., a single image in which a plurality of images are combined or an image captured while rotating at a particular angle or more with reference to a particular point). At this time, the format of images being captured may be diversely varied and implemented.

In an embodiment of the described technology, the camera module 310 may comprise a plurality of cameras capable of photographing the front and the rear. In this case, a plurality of images captured by the plurality of cameras may be converted into a single image using a stitching technique.

As an example, the camera module 310 may capture surroundings at 360 degrees using a camera lens CL. The camera module 310 may comprise a plurality of camera lenses CL, and the plurality of camera lenses CL may be arranged in various positions and directions, so as to be utilized for 360-degree photographing. In this case, the camera module 310 may use a wide-angle lens, a fisheye lens, or the like, and various groups of lenses may be used for 360-degree photographing.

On the other hand, in another embodiment of the described technology, although not explicitly shown in the drawings, the camera module 310 may comprise a single camera unit capable of photographing only one side and a rotation unit that rotates 360 degrees with respect to a reference axis. In this case, the camera module 310 may rotate 360 degrees around a reference axis at a particular point and photograph the surroundings. At this time, images captured continuously by the camera module 310 may similarly be connected to one another via a stitching technique and converted into one image.

The location tracking module 320 measures the location information of the 3D tour photographing apparatus 300 and changes thereof. The location tracking module 320 may use the SLAM (simultaneous localization and mapping) technique to create a map for a space and estimate the current location.

As an example, the SLAM refers to a technique that allows a robot to move around an unknown environment and to creates a map of the unknown environment while recognizing its own location using only the sensors attached to the robot without external help. The SLAM can estimate the location of a moving robot based on several feature points or landmarks of a physical space.

For this, the location tracking module 320 may comprise sensors such as a LiDAR, a camera (e.g., RGB, infrared, ultraviolet), an ultrasonic sensor, a gyro sensor, an acceleration sensor, and the like. In this case, the location tracking module 320 may measure the location coordinates and the location changes of the 3D tour photographing apparatus 300 using a plurality of sensors.

The location tracking module 320 may detect changes in location by extracting feature points from images coming into the plurality of lenses. For example, the location tracking module 320 may receive images through a first lens L1 located on a part of the split-screen and a second lens L2 located on at least a part of the rest of the split-screen, and may extract feature points from a plurality of received images. The location tracking module 320 may determine a location change and direction change by extracting the moving direction and moving speed of the feature points. In this case, the plurality of lenses in the location tracking module 320 may be located in various positions and directions.

The tilt unit 330 may allow the location tracking module 320 to be adjusted in location and direction thereof with reference to the camera module 310. For example, the tilt unit 330 may be provided with a structure capable of rotating the position of the location tracking module 320 in the vertical direction or horizontal direction. In other words, by using the tilt unit 330, the user may adjust the position and angle of the location tracking module 320 with reference to the camera module 310.

On the other hand, in the 3D tour photographing apparatus 300, adjusting the position of the location tracking module 320 to a direction in which a larger number of feature points of an image can be extracted is most important in reducing errors in location information.

Accordingly, if the number of feature points of an image being captured currently is less than a reference value, the 3D tour photographing apparatus 300 may provide an alarm notifying the user to change the position of the location tracking module 320. Such an alarm may be provided in the form of light or sound via the notification unit (150 in FIG. 4). In addition, the alarm may be provided to the user via an application installed in the user device 200.

Additionally, the tilt unit 330 may change the position of the camera module 310 and the location tracking module 320 so that they overlap each other. In other words, the camera module 310 and the location tracking module 320 may be aligned in the same direction. Accordingly, the convenience of portability for users of the 3D tour photographing apparatus 300 can be improved, and the inconvenience that users must separately carry a camera photographing apparatus and a location tracking device can be reduced.

Hereinafter, peripheral devices that transmit and receive data to and from the 3D tour photographing apparatus 300 will be described.

Figure 12:
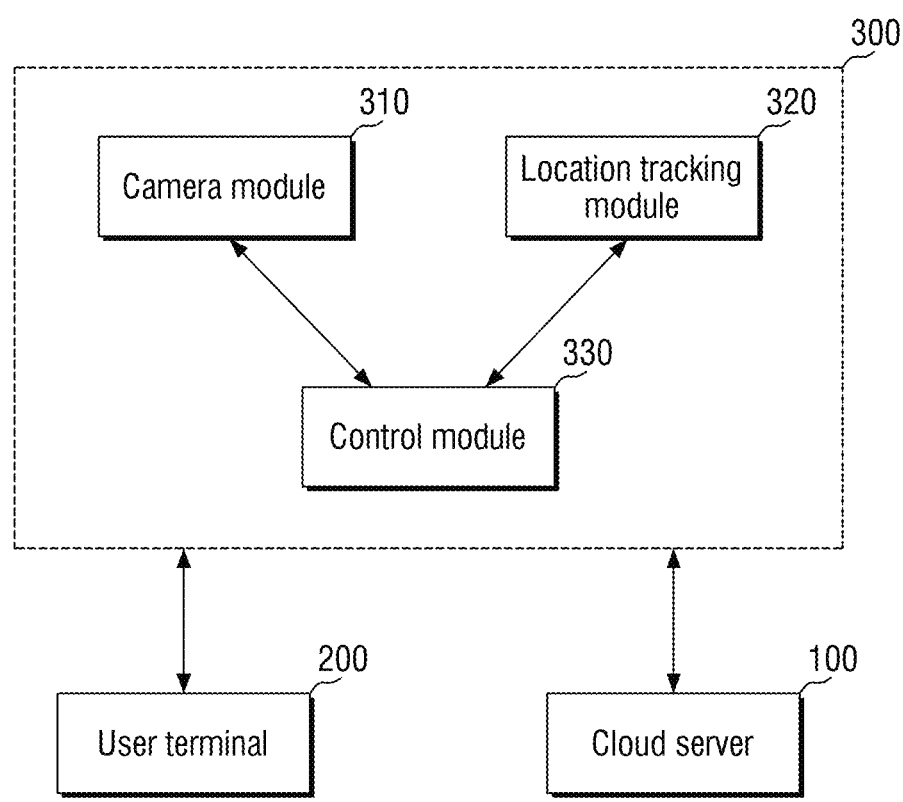
FIG. 12 is a block diagram for illustrating the components of a 3D tour photographing apparatus in accordance with an embodiment of the described technology.

FIG. 12 is a block diagram for illustrating the components of a 3D tour photographing apparatus in accordance with an embodiment of the described technology.

Referring to FIG. 12, the 3D tour photographing apparatus 300 in an embodiment of the described technology may further comprise a control module 340 for controlling the operation of the camera module 310 and the location tracking module 320.

The control module 340 may be connected to the camera module 310 and the location tracking module 320 by wire or wirelessly, and may receive images captured by the camera module 310 and location information measured by the location tracking module 320.

Here, the images captured may be images in an around-view format captured at 360 degrees at a particular point. Also, the images captured may be a plurality of images captured within the same project, and in this case, the control module 340 may combine a plurality of images based on the location information received from the location tracking module 320, to thereby generate a single image representing all 360 degrees.

In this case, the location information received by the control module 340 may comprise coordinate values in a particular coordinate system and time information of that coordinate value. In other words, the location information may also comprise information on the location change that can grasp the movement of coordinate values over time.

Furthermore, the control module 340 may comprise a wireless communication module. Using the wireless communication module, the control module 340 may wirelessly transmit and receive data to and from the user device 200 and the server 100.

For example, the 3D tour photographing apparatus 300 may perform wireless communication using a wireless communication module such as a Wi-Fi module or a Bluetooth module. At this time, in order to minimize communication interference, a communication protocol (e.g., Bluetooth) between the 3D tour photographing apparatus 300 and the user device 200 and a communication protocol (e.g., Wi-Fi) between the 3D tour photographing apparatus 300 and the server 100 may be different from each other.

On the other hand, the user may control the operation of the 3D tour photographing apparatus 300 via the user device 200.

For example, the user may control the operation of the camera module 310 of the 3D tour photographing apparatus 300 via an interface provided by an application pre-installed on the user device 200. In other words, the user may remotely control the camera module 310 through the application of the user device 200, and may acquire 360-degree images for respective photographing points through a photographing command.

Moreover, the 3D tour photographing apparatus 300 may acquire location information using the location tracking module 320 while the camera module 310 is performing a photographing operation.

In this case, if the number of feature points of an image being captured by the location tracking module 320 is less than a reference value, the control module 340 may provide a notification apprising that the angle and position of the location tracking module 320 needs to be adjusted to the notification unit 350 or the user device 200.

The user may change the position of the location tracking module 320 based on the alarm displayed on the user device 200. In this case, the user may adjust the photographing position and direction of the location tracking module 320 by using the tilt unit 330 of the 3D tour photographing apparatus 300.

Furthermore, the tilt unit 330 may comprise an articulation structure capable of freely changing the photographing direction of the location tracking module 320 up and down, and left and right, as described above, and of adjusting the photographing angle. In this case, the tilt unit 330 may employ various structures capable of changing the photographing direction of the location tracking module 320.

Thereafter, if the number of feature points of the image being captured by the location tracking module 320 becomes higher than the reference value according to the changing position of the location tracking module 320, the control module 340 may further provide a notification about that (e.g., a notification that the position setting has been completed, etc.) to the notification unit 350 or the user device 200. As a result, the user can obtain more accurate location information for image capturing.

The server 100 may receive 360-degree images captured by the 3D tour photographing apparatus 300 and location information thereof, and create 3D tours based on the plurality of images and location information received. The 3D tours created may be stored and managed in the storage of the server 100, and the 3D tours stored may be shared with and used by the 3D tour photographing apparatus 300 or the user device 200 when necessary.

Hereinafter, a specific example of a 3D tour photographing apparatus 300 in accordance with an embodiment of the described technology will be described in detail.

Figure 13:
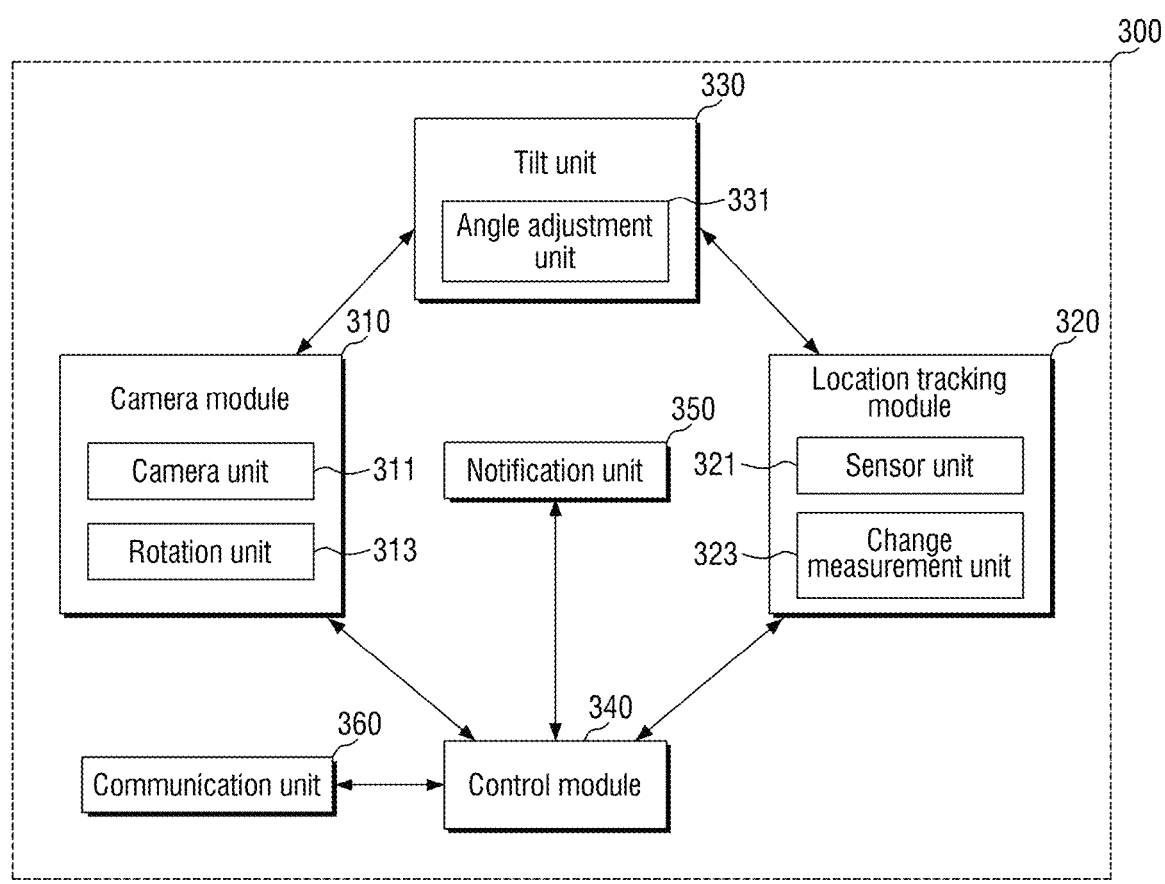
FIG. 13 is a block diagram for illustrating an example of the components of a 3D tour photographing apparatus in accordance with an embodiment of the described technology.

FIG. 13 is a block diagram for illustrating an example of the components of a 3D tour photographing apparatus in accordance with an embodiment of the described technology.

Referring to FIG. 13, the 3D tour photographing apparatus 300 may comprise a camera module 310, a location tracking module 320, a tilt unit 330, a control module 340, a notification unit 350, and a communication unit 360.

First, the camera module 310 may comprise a plurality of camera units 311. In this case, the camera units 311 may capture images of different locations and directions via a plurality of cameras located in various locations and directions.

Furthermore, the camera module 310 may comprise a single camera unit 311 and a rotation unit 313. In this case, the rotation unit 313 allows the camera unit 311 to capture 360-degree images by rotating the camera unit 311 around the reference axis of the 3D tour photographing apparatus 300.

The location tracking module 320 may comprise a sensor unit 321 and a change measurement unit 323. The sensor unit 321 may comprise a plurality of sensors spaced apart from each other, and the sensors may measure various images, location information, and direction information.

Here, the sensors provided in the sensor unit 321 may comprise a LiDAR sensor, an RGB sensor, an infrared sensor, an ultraviolet sensor, an ultrasonic sensor, a gyro sensor, an acceleration sensor, and so on.

For example, a gyro sensor is a sensor capable of measuring the angular velocity of a rotating object, that is how much the angle of the rotating object has changed every second. If the user photographs with the 3D tour photographing apparatus 300, captured images may include information on the rotation angle by a gyro sensor. The 3D tour photographing apparatus 300 may create 3D tours based on the information on the rotation angle in the captured images.

The change measurement unit 323 may receive data measured by the sensor unit 321. The change measurement unit 323 may analyze the received data, so as to measure the location change or direction change of the camera module 310.

The control module 340 may receive around-view images and location information from the camera module 310 and the location tracking module 320. The location information may comprise the location change or direction change of the camera module 310.

The control module 340 may derive a movement path of the camera module 310 based on the data such as the location change and direction change received from the location tracking module 320 and the current location information.

Further, the control module 340 may create 3D tours based on the around-view images, the movement path of the camera module 310, and the photographing location information and data of the images that have been received.

On the other hand, the control module 340 may provide the user with a notification if the number of feature points of an image detected by the location tracking module 320 is less than a reference value or if a location change and direction change are not detected.

In this case, the notification may comprise a notification apprising that the position or angle of the camera module 310 and the location tracking module 320 needs to be adjusted, via the notification unit 350 or an application installed in the user device. The notification may appear in the form of light or sound, or may be provided via a separate message.

If the user changes the location of the location tracking module 320 based on the notification, the control module 340 may determine whether or not the number of feature points of an image recognized by the location tracking module 320 has become higher than a reference value.

If the number of feature points has become higher than the reference value, the control module 340 may display a notification that the recognition of the location change is being performed properly, via the notification unit 350 or an application installed in the user device 200.

In an embodiment of the described technology, the tilt unit 330 may comprise an angle adjustment unit 331, which may be located between the camera module 310 and the location tracking module 320. In this case, the angle adjustment unit 331 may comprise a small motor, a hydraulic structure, or the like.

Further, the operation of the angle adjustment unit 331 may be controlled based on a control signal received from the control module 340. If the number of feature points of an image captured by the location tracking module 320 is less than the reference, the control module 340 may transmit a control signal requesting to adjust the position and angle of the location tracking module 320 to the tilt unit 330. Based on the control signal, the angle adjustment unit 331 may change the position and direction of the location tracking module 320.

If the number of feature points of the image captured by the location tracking module 320 at the changed position becomes higher than the reference value, the control module 340 may transmit a control signal for stopping the operation of the angle adjustment unit 331.

The notification unit 350 may provide the user with a notification apprising that the location of the location tracking module 320 needs to be changed. The notification unit 350 may be provided with a light-emitting device or a sound-generating device, and may provide the user with a corresponding notification using light or sound.

The communication unit 360 may transmit and receive data to and from the user device 200 via a communication module (e.g., Wi-Fi or Bluetooth) using a wireless communication protocol. In addition, the communication unit 360 may transmit the control signal, notification, and the like received from the control module 340 to the user device 200.

Figure 14:
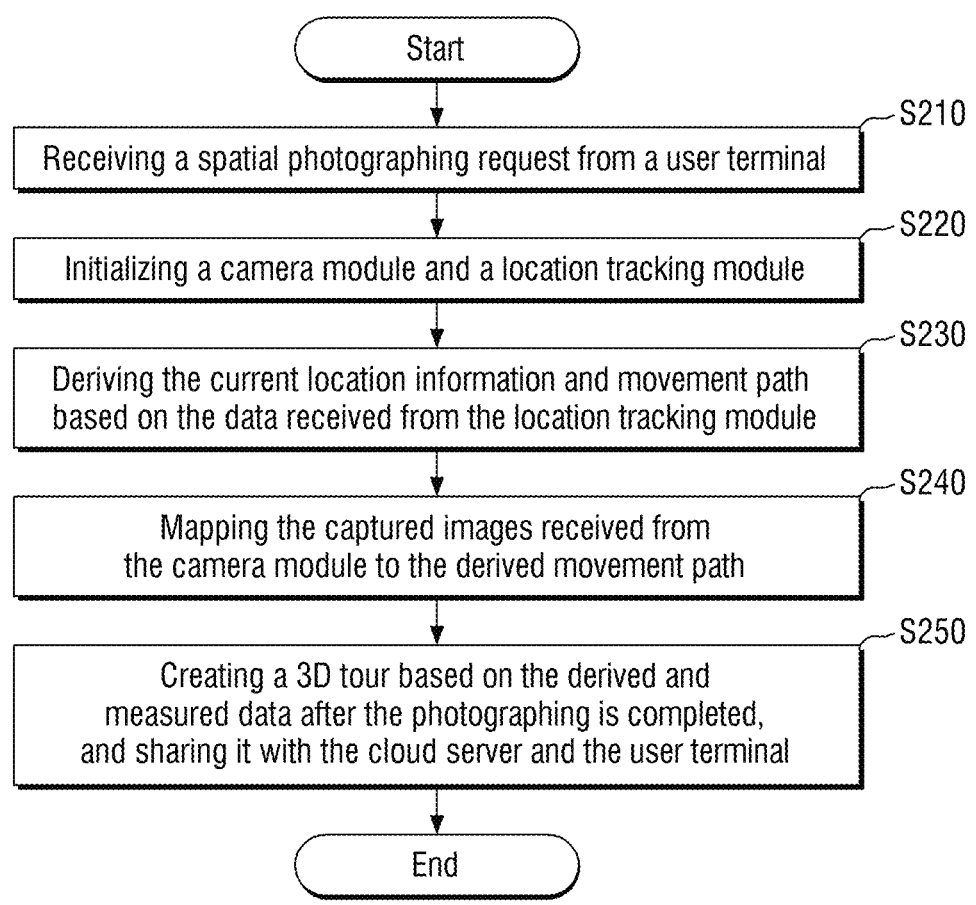
FIG. 14 is a flowchart for illustrating a method of operating a 3D tour photographing apparatus in accordance with an embodiment of the described technology.
Figure 15:
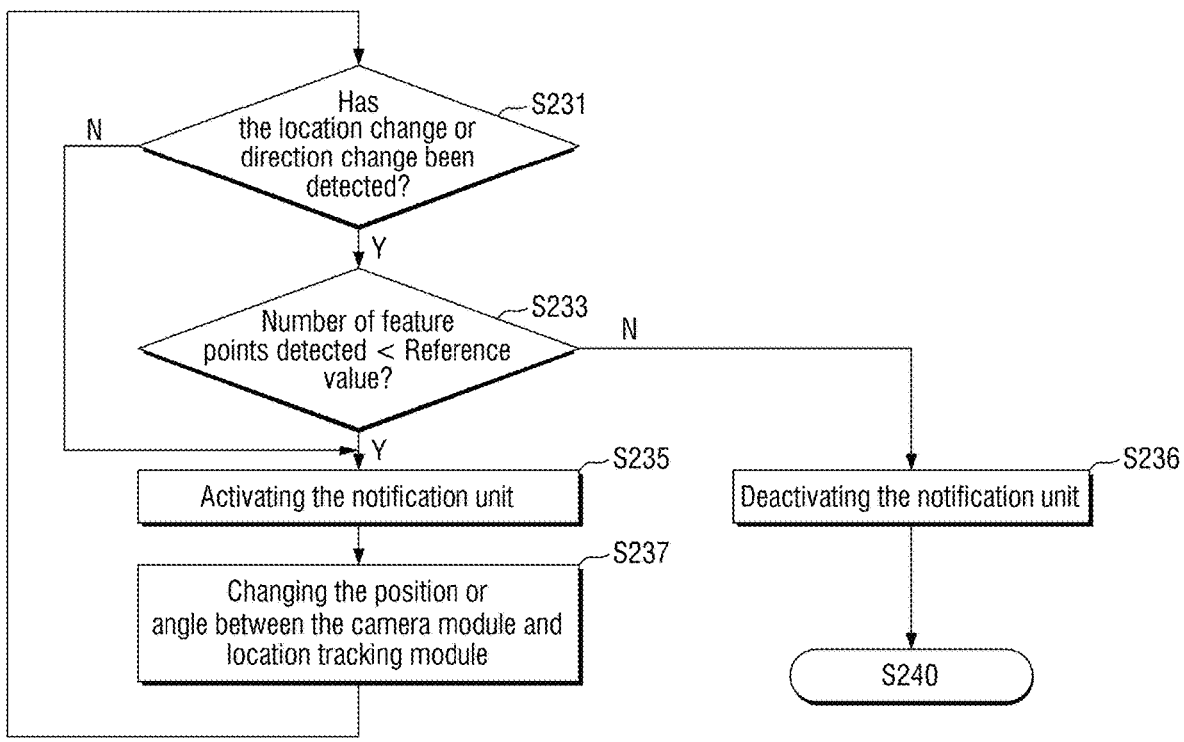
FIG. 15 is a flowchart for illustrating an algorithm for providing a notification of a 3D tour photographing apparatus in accordance with an embodiment of the described technology.

FIG. 14 is a flowchart for illustrating a method of operating a 3D tour photographing apparatus in accordance with an embodiment of the described technology. FIG. 15 is a flowchart for illustrating an algorithm for providing a notification of a 3D tour photographing apparatus in accordance with an embodiment of the described technology.

Referring to FIG. 14, the 3D tour photographing apparatus 300 receives a spatial photographing request from a user device 200 (S210). In this case, a user may instruct the 3D tour photographing apparatus 300 to perform spatial photographing by using an application pre-installed in the user device 200.

The 3D tour photographing apparatus 300 initializes a camera module 310 and a location tracking module 320 (S220). As a result, the 3D tour photographing apparatus 300 may prepare spatial photographing and location tracking.

The 3D tour photographing apparatus 300 derives current location information and a movement path based on the data received from the location tracking module 320 (S230).

As an example, referring to FIG. 15, the 3D tour photographing apparatus 300 determines whether or not a location change or direction change has been detected via the location tracking module 320 of the 3D tour photographing apparatus 300 (S231). In this case, the location tracking module 320 may measure the location change and direction change, and the like of the 3D tour photographing apparatus 300 by using an ultrasonic sensor, a gyro sensor, an acceleration sensor, or the like.

Thereafter, if the location change or direction change of the 3D tour photographing apparatus 300 is detected, the 3D tour photographing apparatus 300 determines whether the number of feature points detected by the location tracking module 320 is less than a reference value (S233).

If no location change or direction change is detected by the location tracking module 320 or the number of feature points detected is less than the reference value, the 3D tour photographing apparatus 300 activates the notification unit 350 (S235).

At this time, the control module 340 may notify the user to adjust the position and angle of the location tracking module 320, by sending a control signal to the notification unit 350. Further, the user may be notified to adjust the position and angle of the location tracking module 320 via an application installed in the user device 200. The user recognizes the displayed notification and changes the position or angle between the camera module 310 and the location tracking module 320 (S237).

If the position and angle of the location tracking module 320 are reset, the 3D tour photographing apparatus 300 repeats steps S231 to S237.

On the other hand, if the location change or direction change is detected by the location tracking module 320 and the number of feature points detected is higher than the reference value, the notification unit 350 in the 3D tour photographing apparatus 300 is deactivated (S236).

Thereafter, referring again to FIG. 5, the 3D tour photographing apparatus 300 maps the captured image received from the camera module 310 to the derived movement path (S240). In other words, the location where the image was captured in the movement path of the 3D tour photographing apparatus 300 is displayed, and the captured image is linked to that location.

The 3D tour photographing apparatus 300 provides the extracted movement path and the image corresponding thereto to the user device 200. That is, the movement path received from the 3D tour photographing apparatus 300 may be displayed on the screen of the user device 200 in the form of a floor plan. The user can select the location where the image was captured in the movement path, and in this case, the user device 200 may display a 3D image for that location.

The 3D tour photographing apparatus 300 creates a 3D tour based on the data measured and derived from the camera module 310 and the location tracking module 320 after the photographing is completed, and shares it with the server 100 (i.e., a cloud server) and the user device (S250).

Hereinafter, an example of a movement path derived in the process of photographing 3D tours, and a 3D tour photographing interface in accordance with an embodiment of the described technology will be described.

Figure 16:
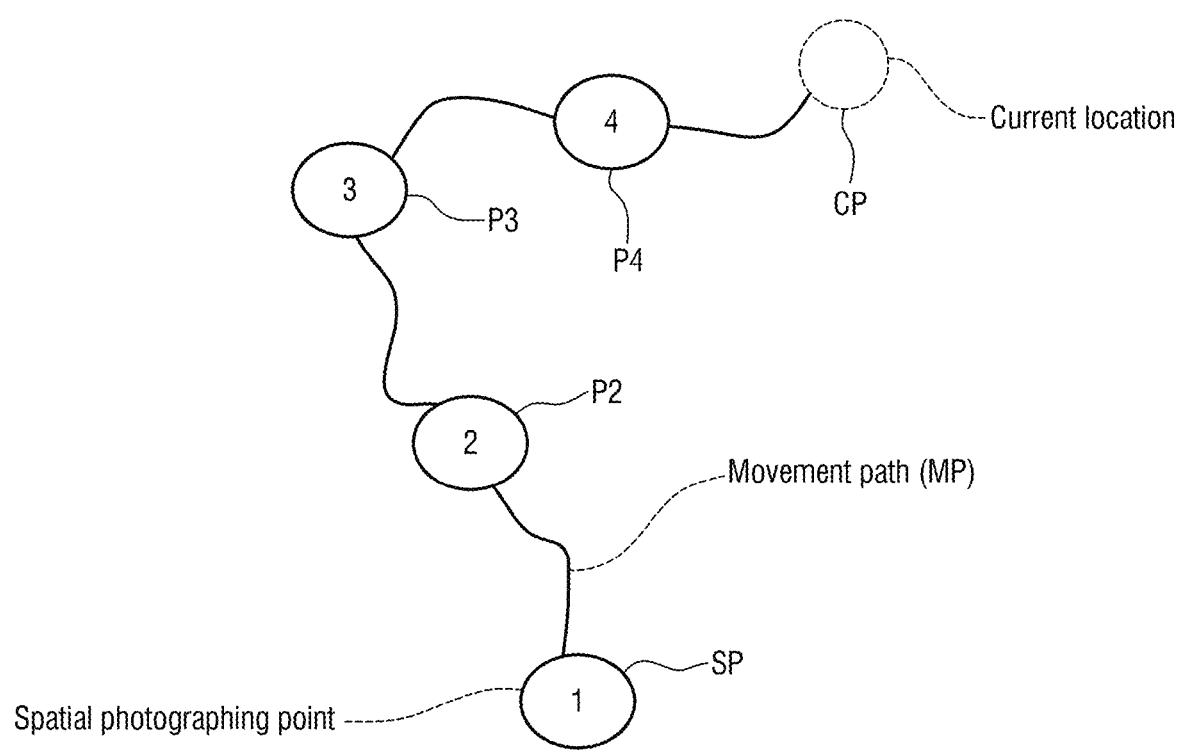
FIGS. 16 and 17 are diagrams for illustrating a movement path and a photographing interface derived from a 3D tour photographing apparatus in accordance with an embodiment of the described technology.
Figure 17:
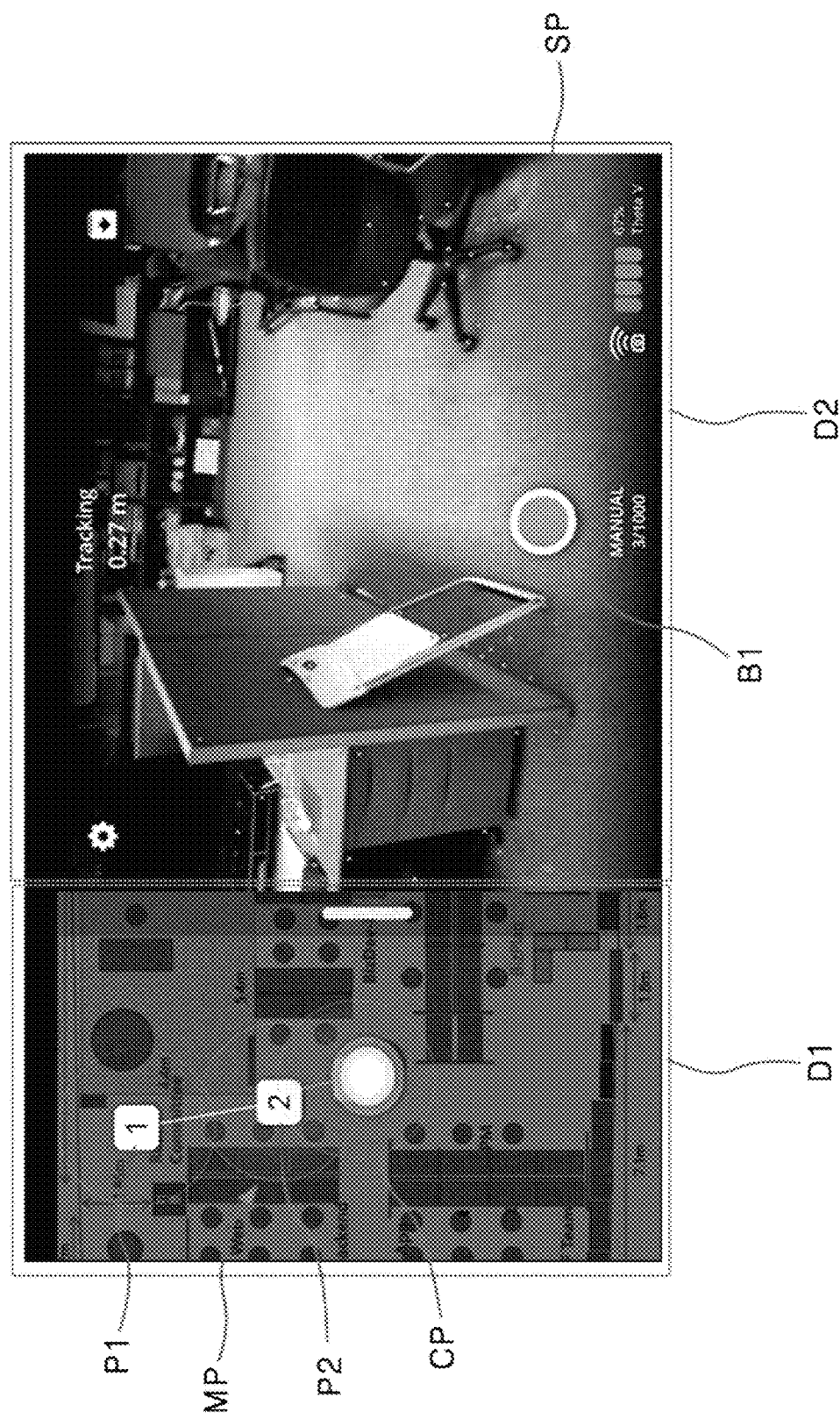

FIGS. 16 and 17 are diagrams for illustrating a movement path and a photographing interface derived from a 3D tour photographing apparatus 300 in accordance with an embodiment of the described technology.

Referring to FIG. 16, FIG. 16 shows a spatial photographing point, and a movement path MP and a current location CP of the 3D tour photographing apparatus 300 during a photographing process.

The 3D tour photographing apparatus 300 may set the spatial photographing point of a first photographing as a starting point SP.

The 3D tour photographing apparatus 300 may derive a movement path through location changes and direction changes measured by a location tracking module 320, and map around-view images captured at a second spatial photographing point P2, a third spatial photographing point P3, and a fourth spatial photographing point P4 on the derived movement path onto the corresponding movement path MP.

At this time, the 3D tour photographing apparatus 300 may use the SLAM technique to derive the location change and the current location coordinate of the 3D tour photographing apparatus 300, even without a GPS signal, and based on this, may derive an accurate movement path MP.

Referring to FIG. 17, the location tracking module 320 included in the 3D tour photographing apparatus 300 of the described technology derives respective feature points included in a screen to be captured.

As an example, the 3D tour photographing apparatus 300 displays a floor plan GP, on which the movement path MP is shown, on a part of a split-screen of a screen, and may display images being captured in real-time in a moving image format on at least a part of the rest of the split-screen of the screen.

For example, the floor plan GP may be displayed in a first area D1 of a split-screen, and a video screen TP being captured may be displayed in a second area D2. The point at which an around-view image was captured may be displayed on the floor plan GP.

The location tracking module 320 extracts locations at which around-view images were captured, and may represent them as a first photographing point P1 and a second photographing point P2 on the floor plan GP and may represent a current photographing point CP indicating the current location.

The user can click a photograph button B1 to start photographing around-view images, and may stop or finish photographing by clicking the photograph button B1 again during the photographing.

A plurality of feature points SP may be distributed in an image being captured, and the location tracking module 320 extracts location changes or direction changes from the distributed feature points SP and may calculate the movement path MP of the 3D tour photographing apparatus 300 using the current location information.

As an example, the location tracking module 320 extracts the moving speed and displacement of the feature points derived. The location tracking module 320 may calculate the current location information for the moved location of the 3D tour photographing apparatus 300 based on the moving speed and displacement of the feature points extracted. The control module 340 may use the data detected by the location tracking module 320 and the current location information, to calculate the movement path MP of the 3D tour photographing apparatus 300.

At this time, if the number of feature points of the image being captured by the location tracking module 320 is less than the reference value, the control module 340 may provide a notification apprising that the angle and position of the location tracking module 320 need to be adjusted to the user device 200.

The user may change the position of the location tracking module 320 based on an alarm displayed on the user device 200. At this time, the user may adjust the photographing direction of the location tracking module 320 by using a tilt unit 330 of the 3D tour photographing apparatus 300.

Thereafter, if the number of feature points of the image being captured by the location tracking module 320 becomes higher than the reference value according to the changing position of the location tracking module 320, the control module 340 may further provide a notification about that to the user device 200. As a result, the user can obtain more accurate location information for image capturing.

In summary, the 3D tour photographing apparatus and method in accordance with the described technology can reduce errors in measurement data and improve convenience of photographing 3D tours, by capturing 360-degree images and tracking the location in an indoor space at the same time.

Moreover, the 3D tour photographing apparatus in accordance with the described technology can improve the accuracy of location measurement, by using the tilt unit capable of changing the photographing angle between the 360-degree image capturing module and the location tracking module, and the camera module and the location tracking module can be stacked and stored, thereby improving the portability of the 3D tour photographing apparatus 300.

In addition, the 3D tour photographing apparatus and method in accordance with the described technology can reduce the number of repetitive photographings when producing 3D tours and can improve the reliability of 3D tour data, by providing a notification when an error occurs in the location measurement due to insufficient feature points in the data captured by the location tracking module, so as to cause the location of the location tracking module to be changed.

As described above, although the described technology has been described with limited embodiments and drawings, the described technology is not limited to the embodiments above and can be modified and changed in various ways from such a description by those of ordinary skill in the art to which the described technology pertains. Therefore, the spirit of the described technology should be grasped only by the claims set forth below, and all equal or equivalent variations thereof are intended to fall within the scope of the spirit of the inventive concept.

What is claimed is:

1. A method for displaying a 3D tour comparison performed by a server for displaying a 3D tour comparison operating in conjunction with a user device, the method comprising:
    setting a first tour serving as a reference for comparison and a second tour to be compared;
    setting any one of a plurality of image photographing points included in the first tour as a first point;
    selecting any one closest to the first point out of a plurality of image photographing points included in the second tour as a second point; and
    displaying an image at the first point of the first tour on a part of a split-screen, and displaying an image at the second point of the second tour on at least a part of the rest of the split-screen, wherein the first tour and the second tour are generated at different times for the same indoor space,
    wherein the displaying an image at the second point of the second tour comprises:
    overlappingly displaying an icon representing a location of another point adjacent to the first point, onto the image at the first point, and
    overlappingly displaying an icon representing a location of another point adjacent to the second point, onto the image at the second point.

2. The method for displaying a 3D tour comparison of claim 1, wherein the first tour comprises a plurality of 360-degree photographed images photographed, respectively, at the plurality of image photographing points, and
    wherein a user of the user device can change a direction of the image at the first point of the first tour in a range of 360 degrees.

3. The method for displaying a 3D tour comparison of claim 1, wherein the displaying an image at the second point of the second tour on at least a part of the rest of the split-screen comprises:
    setting a direction of the image at the first point of the first tour and a direction of the image at the second point of the second tour to be the same.

4. The method for displaying a 3D tour comparison of claim 3, wherein the setting a direction of the image to be the same comprises:
    receiving a control signal for a direction change of the image at the first point of the first tour;
    changing the direction of the image at the first point of the first tour based on the control signal; and
    changing the direction of the image at the second point of the second tour in response to the change in the direction of the image at the first point of the first tour.

5. The method for displaying a 3D tour comparison of claim 1, further comprising:
setting coordinate values for each of the plurality of image photographing points included in the first tour and the second tour.

6. The method for displaying a 3D tour comparison of claim 5, wherein the selecting any one closest to the first point as a second point comprises:
calculating a distance between coordinate values of the first point and coordinate values of each of the plurality of image photographing points included in the second tour; and
selecting an image photographing point with a shortest distance calculated out of the plurality of image photographing points included in the second tour as the second point.

7. The method for displaying a 3D tour comparison of claim 1, wherein the displaying an image at the second point of the second tour comprises:
displaying a first floor plan, on which the plurality of image photographing points included in the first tour are marked, on a part of the split-screen; and
displaying a second floor plan, on which the plurality of image photographing points included in the second tour are marked, on at least a part of the rest of the split-screen.

8. The method for displaying a 3D tour comparison of claim 7, wherein the displaying an image at the second point of the second tour further comprises:
displaying a location and a direction of the first point on the first floor plan; and
displaying a location and a direction of the second point on the second floor plan.

9. The method for displaying a 3D tour comparison of claim 1, further comprising:
receiving a selection for a third tour to be compared;
selecting any one closest to the first point out of a plurality of image photographing points included in the third tour as a third point; and
displaying the image at the first point of the first tour on a part of the split-screen, and displaying an image at the third point of the third tour on at least a part of the rest of the split-screen.

10. A server for displaying a 3D tour comparison, comprising:
a processor; and
a memory having stored thereon a program executed by the processor, the program comprising:
an operation of setting a first tour serving as a reference for comparison and a second tour to be compared;
an operation of setting any one of a plurality of image photographing points included in the first tour as a first point;
an operation of selecting any one closest to the first point out of a plurality of image photographing points included in the second tour as a second point; and
an operation of displaying an image at the first point of the first tour on a part of a split-screen, and displaying an image at the second point of the second tour on at least a part of the rest of the split-screen,
wherein the first tour and the second tour are generated at different times for the same indoor space,
wherein the displaying an image at the second point of the second tour comprises:
overlappingly displaying an icon representing a location of another point adjacent to the first point, onto the image at the first point, and
overlappingly displaying an icon representing a location of another point adjacent to the second point, onto the image at the second point.

11. The server for displaying a 3D tour comparison of claim 10, wherein the program further comprises:
an operation of setting a direction of the image at the first point of the first tour and a direction of the image at the second point of the second tour to be the same.

* * * * *